United States Patent
Yamauchi et al.

(10) Patent No.: US 11,248,084 B2
(45) Date of Patent: Feb. 15, 2022

(54) POLYISOCYANATE MIXTURE, COATING COMPOSITION, AND COATING FILM

(71) Applicant: ASAHI KASEI KABUSHIKI KAISHA, Tokyo (JP)

(72) Inventors: Masakazu Yamauchi, Tokyo (JP); Takashi Fukuchi, Tokyo (JP); Satoshi Takeno, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/340,288

(22) PCT Filed: Oct. 13, 2017

(86) PCT No.: PCT/JP2017/037262
§ 371 (c)(1),
(2) Date: Apr. 8, 2019

(87) PCT Pub. No.: WO2018/070531
PCT Pub. Date: Apr. 19, 2018

(65) Prior Publication Data
US 2019/0284331 A1    Sep. 19, 2019

(30) Foreign Application Priority Data

Oct. 14, 2016 (JP) ............................. JP2016-203085
Oct. 14, 2016 (JP) ............................. JP2016-203086
Oct. 14, 2016 (JP) ............................. JP2016-203109
Oct. 14, 2016 (JP) ............................. JP2016-203110

(51) Int. Cl.
| | |
|---|---|
| *C08G 18/73* | (2006.01) |
| *C08G 18/62* | (2006.01) |
| *C09D 175/14* | (2006.01) |
| *C08G 18/79* | (2006.01) |
| *C09D 175/04* | (2006.01) |
| *C08G 18/80* | (2006.01) |
| *C08G 18/77* | (2006.01) |
| *C08G 18/72* | (2006.01) |

(52) U.S. Cl.
CPC ......... *C08G 18/73* (2013.01); *C08G 18/6225* (2013.01); *C08G 18/721* (2013.01); *C08G 18/725* (2013.01); *C08G 18/771* (2013.01); *C08G 18/792* (2013.01); *C08G 18/794* (2013.01); *C08G 18/798* (2013.01); *C08G 18/8025* (2013.01); *C08G 18/8029* (2013.01); *C09D 175/04* (2013.01); *C09D 175/14* (2013.01)

(58) Field of Classification Search
CPC .... C08G 18/73; C08G 18/721; C08G 18/798; C08G 18/794; C08G 18/8029; C08G 18/771; C08G 18/725; C08G 18/6225; C08G 18/792; C08G 18/8025; C09D 175/04; C09D 175/14
See application file for complete search history.

(56) References Cited

U.S. PATENT DOCUMENTS

| | | | |
|---|---|---|---|
| 5,354,834 | A | 10/1994 | Yoshida et al. |
| 5,714,564 | A | 2/1998 | Shaffer |
| 6,100,326 | A | 8/2000 | Richter et al. |
| 2004/0049003 | A1 | 3/2004 | Asahina et al. |
| 2009/0131603 | A1 | 5/2009 | Asahina et al. |

FOREIGN PATENT DOCUMENTS

| | | |
|---|---|---|
| CA | 2196148 | 8/2006 |
| DE | 19800286 A1 | 7/1999 |
| EP | 0524501 | 1/1993 |
| EP | 0744422 A1 | 11/1996 |
| EP | 1347004 A1 | 9/2003 |
| JP | 53-135931 | 11/1978 |
| JP | 57-198760 | 12/1982 |
| JP | 57-198761 | 12/1982 |
| JP | 60-044561 | 3/1985 |
| JP | S62-179523 A | 8/1987 |
| JP | 63-015264 | 4/1988 |
| JP | 05-222007 | 8/1993 |
| JP | 06-293878 | 10/1994 |
| JP | 09-216930 | 8/1997 |
| JP | 10-087782 | 4/1998 |

(Continued)

OTHER PUBLICATIONS

Search Report issued in European Patent Office (EPO) Patent Application No. 17859817.3, dated Sep. 18, 2019.

(Continued)

*Primary Examiner* — Rabon A Sergent
(74) *Attorney, Agent, or Firm* — Greenblum & Bernstein, P.L.C.

(57) ABSTRACT

Provided is a polyisocyanate mixture including: a triisocyanate compound (A) represented by Formula (I); and polyisocyanate (B) obtained from at least one diisocyanate selected from the group consisting of aliphatic diisocyanate, alicyclic diisocyanate, and aromatic diisocyanate.

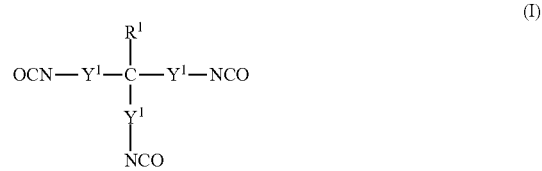

(I)

(In Formula (1), a plurality of $Y^1$'s each independently represent a single bond or a divalent hydrocarbon group having 1 to 20 carbon atoms which may have an ester structure and/or an ether structure. A plurality of $Y^1$'s may be the same as or different from one another. $R^1$ represents a hydrogen atom or a monovalent hydrocarbon group having 1 to 12 carbon atoms.)

8 Claims, No Drawings

(56) References Cited

FOREIGN PATENT DOCUMENTS

| | | |
|---|---|---|
| JP | 3055197 | 6/2000 |
| JP | 2002-003568 | 1/2002 |
| JP | 2002-080779 | 3/2002 |
| JP | 2006-321905 A | 11/2006 |
| JP | 4036750 | 1/2008 |
| JP | 5178200 | 4/2013 |
| JP | 2015-127368 | 7/2015 |
| JP | 2019-014777 | 1/2019 |
| WO | 02/42351 | 5/2002 |
| WO | 2007/046470 | 4/2007 |

OTHER PUBLICATIONS

International Search Report issued in International Patent Application No. PCT/JP2017/037262, dated Nov. 14, 2017, along with English translation.
Written Opinion of the ISA issued in International Patent Application No. PCT/JP2017/037262, dated Nov. 14, 2017, along with English translation.

POLYISOCYANATE MIXTURE, COATING COMPOSITION, AND COATING FILM

TECHNICAL FIELD

The present invention relates to a polyisocyanate mixture, a coating composition, and a coating film.

Priorities are claimed on Japanese Patent Application No. 2016-203085, Japanese Patent Application No. 2016-203110, Japanese Patent Application No. 2016-203086, and Japanese Patent Application No. 2016-203109, filed on Oct. 14, 2016, the contents of which are incorporated herein by reference.

BACKGROUND ART

A urethane coating material using polyisocyanate as a curing agent forms a coating film having excellent durability and chemical resistance, and the demand for the coating material has been increasing every year. Since an isocyanate group contained in polyisocyanate serving as a curing agent reacts with a hydroxyl group of a polyol, frequently used as a main agent, at room temperature, a coating material containing these is applied to various coated materials and the range where the coating material is applied is also wide. In recent years, from the viewpoints of saving the energy and improving the productivity, it has been desired that the time taken to form a coating film from such a coating material is shortened and the curability thereof at a low temperature is improved.

In order to satisfy the above-described requirement, polyisocyanate having a high average number of isocyanate functional groups (the average number of isocyanate groups) has been suggested (for example, see PTLs 1 and 2).

In the related art, a urethane coating film formed of a polyurethane coating material has been widely used for coating materials, foams, and the like because the crosslinking reaction proceeds at room temperature and the urethane coating film has excellent flexibility, chemical resistance, and stain resistance.

Among examples, aromatic diisocyanate or aromatic diisocyanate-derived polyisocyanate has an aromatic ring in a polyisocyanate skeleton. Therefore, it has been known that the drying properties thereof are excellent due to a high glass transition temperature (Tg) and excellent reactivity.

Further, it has been known that, since polyisocyanate derived from alicyclic diisocyanate has a cyclic structure in a polyisocyanate skeleton, the glass transition temperature (Tg) thereof is high and the drying properties thereof are excellent. Further, the polyisocyanate derived from alicyclic diisocyanate is different from the polyisocyanate derived from aromatic diisocyanate similarly having a cyclic structure, in terms that the polyisocyanate derived from alicyclic diisocyanate is unlikely to be yellowed even in a case of being used outdoors. Therefore, the polyisocyanate derived from alicyclic diisocyanate has been provided for outdoor use in many cases.

However, since the polyisocyanate has a cyclic structure, the Tg thereof is high and the obtained coating film tends to be brittle. Accordingly, the impact resistance is insufficient in some cases. As means for improving the impact resistance, techniques of mixing a triisocyanate compound with polyisocyanate obtained from aromatic diisocyanate are disclosed (PTLs 3 and 4).

In the related art, a urethane coating film formed of a polyurethane coating material has excellent flexibility, chemical resistance, and stain resistance, and particularly a coating film using non-yellowing polyisocyanate obtained from aliphatic diisocyanate typified by 1,6-diisocyanato-hexane (hereinafter, also referred to as HDI) as a curing agent has excellent weather resistance, and thus the demand for such coating films has been increasing.

Due to the growing demand for protecting the global environment, recently, techniques for lowering the viscosity of polyisocyanate used as a curing agent have been actively developed. In a case where the viscosity of polyisocyanate is lowered, the amount of an organic solvent to be used in a coating composition can be decreased (PTLs 5 and 6).

However, with these techniques, the number of isocyanate functional groups is decreased and this results in degradation in drying properties in some cases.

In order to solve the above-described problems, a technique for maintaining the number of isocyanate functional groups and lowering the viscosity is disclosed (PTL 7). However, it is desired to further lower the viscosity in some cases.

In order to solve the above-described problems, techniques (PTLs 8 to 10) of using a single triisocyanate compound having a low viscosity or techniques (PTLs 3, 4, 11, and 12) of mixing such a triisocyanate compound with polyisocyanate obtained from aliphatic diisocyanate are disclosed. In a case where these techniques are used, it is possible to satisfy the requirement for lowering the viscosity and improving drying properties.

CITATION LIST

Patent Literature

[PTL 1] Japanese Unexamined Patent Application, First Publication No. H06-293878
[PTL 2] Japanese Unexamined Patent Application, First Publication No. H10-087782
[PTL 3] Japanese Unexamined Patent Application, First Publication No. S57-198760
[PTL 4] Japanese Unexamined Patent Application, First Publication No. S57-198761
[PTL 5] Japanese Unexamined Patent Application, First Publication No. H05-222007
[PTL 6] Japanese Patent No. 3055197
[PTL7] Japanese Patent No. 5178200
[PTL 8] Japanese Examined Patent Application, Second Publication No. S63-015264
[PTL 9] Japanese Unexamined Patent Application, First Publication No. S53-135931
[PTL 10] Japanese Unexamined Patent Application, First Publication No. S60-044561
[PTL 11] Japanese Unexamined Patent Application, First Publication No. H09-216930
[PTL 12] Japanese Patent No. 4036750

SUMMARY OF INVENTION

Technical Problem

However, the polyisocyanates described in PTLs 1 and 2 have excellent curability, but there is still room for improvement in terms of solvent resistance of the obtained coating film and the compatibility with a compound (hereinafter, also referred to as an "active hydrogen compound") having two or more active hydrogens, which react with an isocyanate group such as a polyol serving as a main agent, in a molecule. Further, in the application of a urethane coating material, the coating film is recoated with the same coating material in some cases due to the poor appearance of the surface of the coating film. In this case, the adhesiveness (hereinafter, also referred to as "recoat adhesiveness") between the initial coating film and the recoating film is required, but the polyisocyanates described in PTLs 1 and 2 have another problem in recoat adhesiveness.

In a case where a problem (such as unevenness, foaming, or the like) occurs in the appearance of a coating film at the time of coating of a surface with a urethane coating material, the surface is recoated or a plurality of coating films are laminated in many cases. In this case, recoat adhesiveness becomes required. Here, "foaming" indicates a phenomenon in which small swollen bubbles or holes are generated at the time of curing or drying a coating film. Further, improvement of weather resistance for reducing the frequency of recoating and sagging resistance at the time of coating a vertical surface are also important items as coating workability, and it is difficult to solve all the problems even in a case where the techniques of PTLs 3 and 4 are used. Thus, polyisocyanate having excellent drying properties, impact resistance, solvent resistance, recoat adhesiveness, weather resistance, sagging resistance, and the like has been desired.

Further, in a case of use as a coating composition, a film surface is recoated or a plurality of films are laminated in many cases at the time of occurrence of a problem (such as unevenness, foaming, or the like) in the appearance of the coating film. In this case, the adhesiveness between the coating film and the ground coating film may become a problem. The adhesiveness between the coating film and the ground coating film is insufficient in some cases even in a case where the techniques in PTLs 3, 4, and 8 to 12 are used. Thus, polyisocyanate having a low viscosity, excellent drying properties, and excellent adhesiveness between the coating film and the ground coating film has been desired.

An object of the present invention is to provide a polyisocyanate mixture having excellent coating properties.

Solution to Problem

As the result of intensive research conducted by the present inventors, it was found that the above-described problems can be solved by obtaining a polyisocyanate mixture containing triisocyanate having a specific structure and specific polyisocyanate, thereby completing the present invention.

In other words, the present invention is as follows.

[1] A polyisocyanate mixture including: a triisocyanate compound (A) represented by Formula (I); and polyisocyanate (B) obtained from at least one diisocyanate selected from the group consisting of aliphatic diisocyanate, alicyclic diisocyanate, and aromatic diisocyanate.

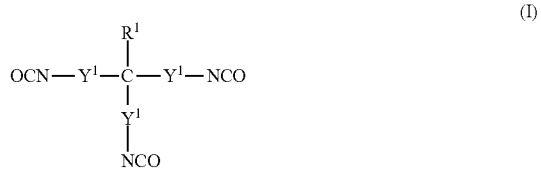

(In Formula (I), a plurality of $Y^1$'s each independently represent a single bond or a divalent hydrocarbon group having 1 to 20 carbon atoms which may have an ester structure and/or an ether structure, a plurality of $Y^1$'s may be the same as or different from one another, and $R^1$ represents a hydrogen atom or a monovalent hydrocarbon group having 1 to 12 carbon atoms.)

[2] The polyisocyanate mixture according to [1], in which a content of the triisocyanate compound (A) is in a range of 10% by mass to 90% by mass.

[3] A coating composition including: the polyisocyanate mixture according to [1] or [2]; and a compound which has two or more active hydrogens in a molecule.

[4] A coating film which is obtained by curing the coating composition according to [3].

[5] The polyisocyanate mixture according to [1] or [2], in which the polyisocyanate (B) is polyisocyanate (B1) having a number average molecular weight of 850 to 5000, which is obtained from at least one diisocyanate selected from the group consisting of aliphatic diisocyanates.

[6] The polyisocyanate mixture according to [5], in which the polyisocyanate (B1) is obtained by using a polyol containing a bifunctional or higher functional hydroxyl group as a raw material.

[7] The polyisocyanate mixture according to [5] or [6], in which the polyisocyanate (B1) is obtained by using a polyol containing a trifunctional or higher functional hydroxyl group as a raw material.

[8] The polyisocyanate mixture according to any one of [5] to [7], in which the polyisocyanate (B1) is obtained by using a polyester polyol containing a trifunctional or higher functional hydroxyl group as a raw material.

[9] The polyisocyanate mixture according to any one of [5] to [8], in which a number average molecular weight of the polyisocyanate (B1) is in a range of 850 to 4000.

[10] The polyisocyanate mixture according to any one of [5] to [9], in which an average number of isocyanate groups is in a range of 3.2 to 8.

[11] The polyisocyanate mixture according to [1] or [2], in which the polyisocyanate (B) is aromatic diisocyanate (B2-1) or polyisocyanate (B2-2) derived from aromatic diisocyanate, and an expression of a/(a+b+c) in a case where each mol % of an isocyanurate structure, a urethane structure, and an allophanate structure in the polyisocyanate (B) is set as a, b, and c is 0.10 or greater.

[12] The polyisocyanate mixture according to [1] or [2], in which the polyisocyanate (B) is polyisocyanate (B3) derived from alicyclic diisocyanate, and an expression of a/(a+b+c) in a case where each mol % of an isocyanurate structure, a urethane structure, and an allophanate structure in the polyisocyanate (B) is set as a, b, and c is 0.10 or greater.

[13] The polyisocyanate mixture according to [1] or [2], in which the polyisocyanate (B) is polyisocyanate (B4) which is obtained from aliphatic diisocyanate containing at least 1,6-diisocyanatohexane and in which an expression of (a+b)/(a+b+c+d+e+f) in a case where each mol % of an uretdione structure, an iminooxadiazine dione structure, an isocyanurate structure, an allophanate structure, a urethane structure, and a biuret structure is set as a, b, c, d, e, and f is in a range of 0.02 to 0.50.

[14] The polyisocyanate mixture according to [13], in which the polyisocyanate (B4) contains 1% to 40% by mass of an uretdione dimer derived from aliphatic isocyanate.

Another aspect of the present invention is as follows.

[1-1] A polyisocyanate composition including: a triisocyanate compound represented by Formula (I); and polyisocyanate which is obtained from at least one diisocyanate selected from the group consisting of aliphatic diisocyanate and alicyclic diisocyanate and has a number average molecular weight of 700 to 5000, in which an average number of isocyanate groups is in a range of 3.3 to 10.

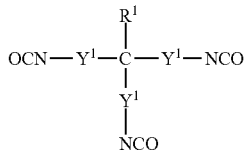

(In Formula (I), a plurality of $Y^1$'s each independently represent a single bond or a divalent hydrocarbon group having 1 to 20 carbon atoms which may have an ester structure and/or an ether structure, a plurality of $Y^1$'s may be the same as or different from one another, and $R^1$ represents a hydrogen atom or a monovalent hydrocarbon group having 1 to 12 carbon atoms.)

[1-2] The polyisocyanate composition according to [1-1], in which a viscosity thereof at 25° is in a range of 200 m·Pas to 10000 mPa·s.

[1-3] The polyisocyanate composition according to [1-1] or [1-2], which contains 10% by mass to 90% by mass of the triisocyanate compound.

[1-4] A coating composition including: the polyisocyanate composition according to any one of [1-1] to [1-3]; and a compound which has two or more active hydrogens in a molecule.

[1-5] A coating film which is obtained by curing the coating composition according to [1-4].

Still another aspect of the present invention is as follows.

[2-1] A polyisocyanate mixture including: at least one triisocyanate represented by Formula (I) (component [A]); and aromatic diisocyanate or polyisocyanate derived from aromatic diisocyanate (component [B]), in which the following (i) and/or (ii) is satisfied.

(i) An expression of a/(a+b+c) in a case where each mol % of an isocyanurate structure, a urethane structure, and an allophanate structure in the component [B] is set as a, b, and c is 0.10 or greater.

(ii) At least one of a plurality of $Y^1$'s in Formula (I) has an ester structure.

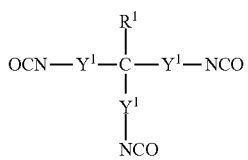

[In Formula (I), a plurality of $Y^1$'s each independently represent a single bond or a divalent hydrocarbon group having 1 to 20 carbon atoms which may have an ester structure and/or an ether structure, a plurality of $Y^1$'s may be the same as or different from one another, and $R^1$ represents a hydrogen atom or a monovalent hydrocarbon group having 1 to 12 carbon atoms.]

[2-2] The polyisocyanate mixture according to [2-1], in which hydrocarbon groups as all $Y^1$'s in Formula (I) are formed of an aliphatic group and/or an alicyclic group.

[2-3] The polyisocyanate mixture according to [2-1] or [2-2], in which all $Y^1$'s in Formula (I) are formed of only a hydrocarbon group.

[2-4] The polyisocyanate mixture according to any one of [2-1] to [2-3], in which one or more of the plurality of $Y^1$'s in Formula (I) have an ester structure.

[2-5] A coating composition including: the polyisocyanate mixture according to any one of [2-1] to [2-4]; and a polyol.

[2-6] A coating film which is obtained by curing the coating composition according to [2-5].

Even still another aspect of the present invention is as follows.

[3-1] A polyisocyanate mixture including: triisocyanate [A] represented by Formula (I); and polyisocyanate [B] derived from alicyclic diisocyanate, in which the following (i) and/or (ii) is satisfied.

(i) An expression of a/(a+b+c) in a case where each mol % of an isocyanurate structure, a urethane structure, and an allophanate structure in the polyisocyanate [B] is set as a, b, and c is 0.10 or greater.

(ii) At least one of a plurality of $Y^1$'s in Formula (I) has an ester structure.

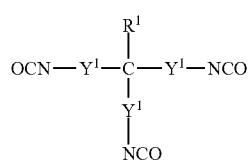

(In Formula (I), a plurality of $Y^1$'s each independently represent a single bond or a divalent hydrocarbon group having 1 to 20 carbon atoms which may have an ester structure and/or an ether structure, a plurality of $Y^1$'s may be the same as or different from one another, and $R^1$ represents a hydrogen atom or a monovalent hydrocarbon group having 1 to 12 carbon atoms.)

[3-2] The polyisocyanate mixture according to [3-1], in which all $Y^1$'s in the triisocyanate [A] do not have an aromatic ring structure.

[3-3] The polyisocyanate mixture according to [3-1], in which all $Y^1$'s in the triisocyanate [A] do not have an alicyclic structure.

[3-4] The polyisocyanate mixture according to [3-1], in which all $Y^1$'s in the triisocyanate [A] do not have an ether structure.

[3-5] A coating composition including: the polyisocyanate mixture according to any one of [3-1] to [3-4]; and a compound having two or more active hydrogens in a molecule.

[3-6] A coating film which is obtained by curing the coating composition according to [3-5].

Even still another aspect of the present invention is as follows.

[4-1] A polyisocyanate mixture including: at least one triisocyanate [A] represented by Formula (I); and polyisocyanate (B) which is obtained from aliphatic diisocyanate containing at least 1,6-diisocyanatohexane and in which an expression of (a+b)/(a+b+c+d+e+f) in a case where each mol % of an uretdione structure, an iminooxadiazine dione structure, an isocyanurate structure, an allophanate structure, a urethane structure, and a biuret structure is set as a, b, c, d, e, and f is in a range of 0.02 to 1.0.

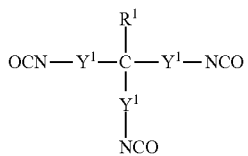

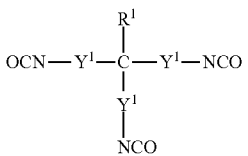

[In Formula (I), a plurality of $Y^1$'s each independently represent a single bond or a divalent hydrocarbon group having 1 to 20 carbon atoms which may have an ester structure and/or an ether structure, a plurality of $Y^1$'s may be the same as or different from one another, and $R^1$ represents a hydrogen atom or a monovalent hydrocarbon group having 1 to 12 carbon atoms.]

[4-2] The polyisocyanate mixture according to [4-1], in which hydrocarbon groups as all $Y^1$'s in the triisocyanate [A] are formed of an aliphatic group and/or an alicyclic group.

[4-3] The polyisocyanate mixture according to [4-1] or [4-2], in which all $Y^1$'s in the triisocyanate [A] are formed of only a hydrocarbon group.

[4-4] The polyisocyanate mixture according to [4-1] or [4-2], in which one or more of the plurality of $Y^1$'s in the triisocyanate [A] have an ester structure.

[4-5] The polyisocyanate mixture according to any one of [4-1] to [4-4], in which an absolute amount of an uretdione dimer derived from aliphatic diisocyanate in the polyisocyanate mixture is in a range of 1% by mass to 40% by mass.

[4-6] A coating composition including: the polyisocyanate mixture according to any one of [4-1] to [4-5]; and a polyol.

[4-7] A coating film which is obtained by curing the coating composition according to [4-6].

Advantageous Effects of Invention

According to the present invention, it is possible to provide a polyisocyanate mixture having excellent coating properties.

DESCRIPTION OF EMBODIMENTS

Hereinafter, modes for carrying out the present invention (hereinafter, simply referred to as the "present embodiment") will be described in detail. The following present embodiment is merely an example for explaining the present invention and is not intended to limit the present invention to the contents described below. The present invention can be carried out by being appropriately modified within the range of the scope.

In the present specification, "polyisocyanate" indicates a polymer obtained by bonding a plurality of monomers containing one or more isocyanate groups (—NCO).

In the present specification, a "polyol" indicates a compound containing two or more hydroxy groups (—OH).

Further, unless otherwise specified, "(meth)acryl" includes methacryl and acryl, and "(meth)acrylate" includes methacrylate and acrylate.

<<Polyisocyanate Mixture>>

A polyisocyanate mixture of the present embodiment is a polyisocyanate mixture which contains a triisocyanate compound (A) represented by Formula (I); and polyisocyanate (B) obtained from at least one diisocyanate selected from the group consisting of aliphatic diisocyanate, alicyclic diisocyanate, and aromatic diisocyanate.

(In Formula (I), a plurality of $Y^1$'s each independently represent a single bond or a divalent hydrocarbon group having 1 to 20 carbon atoms which may have an ester structure and/or an ether structure. A plurality of $Y^1$'s may be the same as or different from one another. $R^1$ represents a hydrogen atom or a monovalent hydrocarbon group having 1 to 12 carbon atoms.)

<Triisocyanate Compound (A)>

The triisocyanate compound (A) used in the present embodiment can be obtained by, for example, isocyanating an amino acid derivative or an amine such as an ether amine or an alkyl triamine.

As the amino acid derivative, for example, 2,5-diaminovaleric acid, 2,6-diaminohexanoic acid, aspartic acid, or glutamic acid can be used. Since these amino acids are diaminemonocarboxylic acids or monoamine dicarboxylic acids, the carboxyl group is esterified with an alkanolamine such as an ethanolamine. The triamine containing an ester group obtained as described above is phosgenated to obtain a triisocyanate compound (A) having an ester structure.

Examples of the ether amine include "D403" (trade name, manufactured by Mitsui Fine Chemicals, Inc.) which is polyoxyalkylene triamine. This product is a triamine and the amine can be phosgenated to obtain a triisocyanate compound (A) having an ether structure.

Examples of the alkyl triamine include triisocyanatononane (4-aminomethyl-1,8-octanediamine). This product is a triamine and the amine can be phosgenated to obtain a triisocyanate compound (A) containing only a hydrocarbon.

[$Y^1$]

In Formula (I), a plurality of $Y^1$'s each independently represent a single bond or a divalent hydrocarbon group having 1 to 20 carbon atoms which may have an ester structure [—C(=O)—O—] and/or an ether structure (—O—). A plurality of $Y^1$'s may be the same as or different from one another.

Examples of the divalent hydrocarbon group having 1 to 20 carbon atoms which may have an ester structure and/or an ether structure include a group represented by —(CH$_2$)$_{n1}$—X—(CH$_2$)$_{n2}$— (n1 and n2 each independently represent an integer of 0 to 10. Here, both of n1 and n2 do not represent 0, and it is preferable that one or more of n1 and n2 are bonded to NCO. X represents an ester group or an ether group.).

In a case where the reaction rate is intended to be increased, it is preferable that X represents an ester group.

n1 and n2 represent preferably 0 to 4 and more preferably 0 to 2. Examples of the combination of n1 and n2 include a combination of n1 representing 0 and n2 representing 2 and a combination of n1 representing 2 and n2 representing 2.

[$R^1$]

$R^1$ represents a hydrogen atom or a monovalent hydrocarbon group having 1 to 12 carbon atoms. The hydrocarbon group as $R^1$ is not particularly limited, and examples thereof include an alkyl group, an alkenyl group, and an alkynyl group. It is preferable that $R^1$ represents a hydrogen atom.

In order to lower the viscosity of the triisocyanate compound used in the present embodiment, it is preferable that hydrocarbon groups in the plurality of $Y^1$'s in Formula (I) contain an aliphatic group and/or an aromatic group.

In order to improve the weather resistance at the time of being used as a curing agent of a coating composition, it is preferable that hydrocarbon groups in the plurality of $Y^1$'s contain an aliphatic group and/or an alicyclic group.

In addition, in order to hold the heat resistance, it is preferable that $Y^1$ contains a hydrocarbon group containing an ester group.

Examples corresponding to the above-described classifications include 4-isocyanate methyl-1,8-octamethylene diisocyanate (hereinafter, referred to as NTI, molecular weight of 251) disclosed in Japanese Patent No. 1468856 and PCT International Publication No. WO1996/017881; 1,3,6-hexamethylene triisocyanate (hereinafter, referred to as HTI, molecular weight of 209) disclosed in Japanese Unexamined Patent Application, First Publication No. S57-198760; bis (2-isocyanatoethyl) 2-isocyanatoglutarate (hereinafter, referred to as GTI, molecular weight of 311) disclosed in Japanese Examined Patent Application, Second Publication No. 04-001033; and lysine triisocyanate (hereinafter, referred to as LTI, molecular weight of 267) disclosed in Japanese Unexamined Patent Application, First Publication No. S53-135931.

Among these, from the viewpoint of further improving the reactivity with the isocyanate group, NTI, GTI, or LTI is preferable, NTI or LTI is more preferable, and LTI is particularly preferable.

Meanwhile, in order to hold the hydrolysis resistance, it is preferable that $Y^1$'s are formed of only hydrocarbon groups.

Examples corresponding to this classification include 4-isocyanate methyl-1,8-octamethylene diisocyanate (hereinafter, referred to as NTI, molecular weight of 251) disclosed in Japanese Patent No. 1468856; and 1,3,6-hexamethylene triisocyanate (hereinafter, referred to as HTI, molecular weight of 209) disclosed in Japanese Unexamined Patent Application, First Publication No. S57-198760.

<Polyisocyanate (B)>

The diisocyanate serving as a raw material of the polyisocyanate contained in the polyisocyanate mixture of the present embodiment is one or more diisocyanates selected from the group consisting of aliphatic diisocyanate, alicyclic diisocyanate, and aromatic diisocyanate.

In the present embodiment, the "aliphatic diisocyanate" indicates a compound which contains two isocyanate groups and a chain-like aliphatic hydrocarbon in a molecule and does not contain an aromatic hydrocarbon.

The aliphatic diisocyanate is not particularly limited, and the number of carbon atoms thereof is preferably 4 to 30. Examples thereof include tetramethylene diisocyanate, pentamethylene diisocyanate, hexamethylene diisocyanate (hereinafter, abbreviated as "HDI"), 2,2,4-trimethyl-1,6-hexamethylene diisocyanate, and lysine diisocyanate. Among these, from the viewpoint of ease of industrial availability, HDI is preferable. The aliphatic diisocyanate described above may be used alone or in combination of two or more kinds thereof.

In the present embodiment, "alicyclic diisocyanate" indicates a compound which contains two isocyanate groups in a molecule and a cyclic aliphatic hydrocarbon which does not have aromaticity.

The alicyclic diisocyanate is not particularly limited, and the number of carbon atoms thereof is preferably in a range of 8 to 30. Examples thereof include isophorone diisocyanate (hereinafter, abbreviated as "IPDI"), 1,3-bis(isocyanatomethyl)-cyclohexane, 4,4'-dicyclohexylmethane diisocyanate, norbornene diisocyanate, and hydrogenated xylylene diisocyanate. Among these, from the viewpoints of the weather resistance and ease of industrial availability, IPDI is more preferable. The alicyclic diisocyanate may be used alone or in combination of two or more kinds thereof.

In the present embodiment, examples of the aromatic diisocyanate include 2,4-tolylene diisocyanate, 2,6-tolylene diisocyanate, 4,4'-diphenylmethane diisocyanate, naphthalene diisocyanate, and xylylene diisocyanate (hereinafter, referred to as XDI). Among these, from the viewpoint of ease of industrial availability, 2,4-tolylene diisocyanate, 2,6-tolylene diisocyanate, and 4,4'-diphenylmethane diisocyanate are desirable. From the viewpoint of weather resistance, XDI is preferable. The aromatic diisocyanate may be used alone or in combination of two or more kinds thereof.

<Other Compounds>

From the viewpoints of preventing coloration at the time of long-term storage and improving long-term storage stability, it is preferable that the polyisocyanate mixture of the present embodiment contains 1.0 ppm by mass to $1.0 \times 10^4$ ppm by mass of one or more compounds selected from the group consisting of an unsaturated bond-containing compound, an inactive compound, a metal atom, a basic amino compound, and carbon dioxide based on the amount of the triisocyanate compound (A). The lower limit of the above-described range of the content is more preferably 3.0 ppm by mass or greater, still more preferably 5.0 ppm by mass or greater, and even still more preferably 10 ppm by mass or greater. Further, the upper limit of the above-described range of the content is more preferably $5.0 \times 10^3$ ppm by mass or less, still more preferably $3.0 \times 10^3$ ppm by mass or less, and even still more preferably $1.0 \times 10^3$ ppm by mass or less.

It is preferable that the unsaturated bond-containing compound of the present embodiment is a compound whose unsaturated bond is a carbon-carbon unsaturated bond, a carbon-nitrogen unsaturated bond, or a carbon-oxygen unsaturated bond. From the viewpoint of the stability of the compound, the compound whose unsaturated bond is a double bond is preferable. As the double bond, a carbon-carbon double bond (C=C) or a carbon-oxygen double bond (C=O) is more preferable. Further, it is preferable that carbon atoms constituting the compound are bonded to three or more atoms.

Typically, the carbon-carbon double bond is a carbon-carbon double bond constituting an aromatic ring in some cases. However, as an example of the unsaturated bond contained in the unsaturated bond-containing compound of the present embodiment, a carbon-carbon double bond constituting an aromatic ring is not included.

Examples of the compound having a carbon-oxygen double bond include a carbonic acid derivative. Examples of the carbonic acid derivative include a urea compound, carbonic acid ester, N-unsubstituted carbamic acid ester, and N-substituted carbamic acid ester.

The inactive compounds of the present embodiment are classified into the following compounds A to G.

Hydrocarbon compounds, ether compounds and sulfide compounds, halogenated hydrocarbon compounds, silicon-containing hydrocarbon compounds, and silicon-containing ether compounds and silicon-containing sulfide compounds are respectively classified into the following compounds A and compounds B, the following compounds C to E, the following compounds F, and the following compounds G. Further, each of the compounds A to G exemplified here does not have an unsaturated bond other than an aromatic ring and does not include a compound having the above-described unsaturated bond.

Compounds A: aliphatic hydrocarbon compounds having a linear, branched, or cyclic structure Compounds B: aromatic hydrocarbon compounds which may be substituted with aliphatic hydrocarbon groups Compounds C: compounds which have an ether bond or a sulfide bond and an aliphatic hydrocarbon group and in which aliphatic hydrocarbon compounds which are the same or different from each other are bonded through an ether bond or a sulfide bond Compounds D: compounds which have an ether bond or a sulfide bond and an aromatic hydrocarbon group and in which aromatic hydrocarbon compounds which are the same or different from each other are bonded through an ether bond or a sulfide bond Compounds E: compounds which have an ether bond or a sulfide bond, an aliphatic hydrocarbon group, and an aromatic hydrocarbon group Compounds F: halides in which at least one hydrogen atom constituting an aliphatic hydrocarbon compound or at least one hydrogen atom constituting an aromatic hydrocarbon compound is substituted with a halogen atom Compounds G: compounds in which some or all carbon atoms of the compounds A to E are substituted with silicon atoms The metal atom of the present embodiment may be present as a metal ion or a simple substance of a metal atom. Further, the metal atom may be one metal atom or a combination of a plurality of metal atoms. As the metal atom, a metal atom which can have a valence of 2 to 4 is preferable. Among such examples, one or a plurality of metals selected from iron, cobalt, nickel, zinc, tin, copper, and titanium are more preferable.

The basic amino compound of the present embodiment is a derivative of ammonia and examples thereof include a compound (primary) in which one hydrogen atom thereof has been substituted with an alkyl group or an aryl group, a compound (secondary) in which two hydrogen atoms thereof have been substituted with an alkyl group or an aryl group, and a compound (tertiary) in which three hydrogen atoms thereof have been substituted. The basic amino compound which can be preferably used in the present invention is a secondary or tertiary amino compound, and examples thereof include an aliphatic amine, aromatic amine, a heterocyclic amine, and a basic amino acid.

Carbon dioxide may be dissolved in isocyanate at a normal pressure or may be put in a pressure container and allowed to be dissolved in a pressurized state. In a case where carbon dioxide containing the moisture is used, this may cause hydrolysis of isocyanate. Therefore, it is preferable that the amount of moisture contained in the carbon dioxide is controlled as necessary.

From the viewpoint of preventing coloration, it is preferable that the content of halogen atoms in the polyisocyanate mixture of the present embodiment is $1.0 \times 10^2$ ppm by mass or less. The halogen atoms are not particularly limited, but chlorine and/or bromine is preferable, and at least one ion and/or compound selected from a chlorine ion, a bromine ion, hydrolyzable chlorine, and hydrolyzable bromine is more preferable. A carbamoyl chloride compound obtained by adding hydrogen chloride to an isocyanate group is exemplified as the hydrolyzable chlorine and a carbamoyl bromide compound obtained by adding hydrogen bromide to an isocyanate group is exemplified as the hydrolyzable bromine.

<<Coating Composition>>

The polyisocyanate mixture of the present embodiment can be suitably used as a curing agent or the like of a coating composition. In other words, a coating composition containing the polyisocyanate mixture of the present embodiment can be obtained. As a resin component of the coating composition, it is preferable that the coating composition contains a compound having two or more active hydrogens having reactivity with an isocyanate group in a molecule. Examples of the compound having two or more active hydrogens in a molecule include a polyol, a polyamine, and a polythiol. Among these, a polyol is preferable. Specific examples of the polyol include a polyester polyol, a polyether polyol, an acrylic polyol, a polyolefin polyol, and a fluorine polyol.

The coating composition of the present embodiment contains the polyisocyanate mixture of the present embodiment and a compound having two or more active hydrogens in a molecule.

The coating composition of the present embodiment can be used as a solvent-based coating composition or a water-based coating composition.

In a case where the coating composition of the present embodiment is used as a solvent-based coating composition, additives such as another resin, a catalyst, a pigment, a leveling agent, an antioxidant, a ultraviolet absorbing agent, a light stabilizer, a plasticizer, and a surfactant are added to a resin that contains a compound having two or more active hydrogens in a molecule or a solvent dilution thereof, as necessary, the polyisocyanate mixture of the present embodiment is added thereto as a curing agent, and a solvent is further added thereto as necessary so that the viscosity of the mixture is adjusted, the solution is stirred manually or using stirring equipment such as a mixer, thereby obtaining a solvent-based coating composition.

In a case where the coating composition of the present embodiment is used as a water-based coating composition, additives such as another resin, a catalyst, a pigment, a leveling agent, an antioxidant, a ultraviolet absorbing agent, a light stabilizer, a plasticizer, and a surfactant are added to a water dispersion of a resin that contains a compound having two or more active hydrogens in a molecule or water-soluble matter, as necessary, the polyisocyanate mixture of the present embodiment is added thereto as a curing agent, and water or a solvent is further added thereto as necessary, and the solution is forcibly stirred using stirring equipment, thereby obtaining a water-based coating composition.

The polyester polyol can be obtained by, for example, carrying out a condensation reaction between one or a mixture of dibasic acids such as succinic acid, adipic acid, dimer acid, maleic anhydride, phthalic anhydride, isophthalic acid, terephthalic acid, and carboxylic acid such as 1,4-cyclohexanedicarboxylic acid and one or a mixture of polyhydric alcohols such as ethylene glycol, propylene glycol, diethylene glycol, 1,4-butanediol, neopentyl glycol, 1,6-hexanediol, trimethylpentanediol, cyclohexanediol, trimethylolpropane, glycerin, pentaerythritol, 2-methylolpropanediol, and ethoxylated trimethylolpropane.

For example, the condensation reaction can be performed by putting the above-described components together and heating the components at approximately 160° C. to 220° C. Further, for example, polycaprolactones obtained by performing ring-opening polymerization on lactones such as ε-caprolactone using polyhydric alcohol can also be used as polyester polyols. These polyester polyols can be modified using aromatic diisocyanate, aliphatic diisocyanate, alicyclic diisocyanate, and polyisocyanate obtained from these. In this case, from the viewpoints of weather resistance and yellowing resistance, aliphatic diisocyanate, alicyclic diisocyanate, and polyisocyanate obtained from these are particularly preferable. In a case where the composition is used as a water-based coating material, some carboxylic acids of partially remaining dibasic acids and the like are allowed to remain and neutralized with a base such as an amine or ammonia so that a water-soluble or water-dispersible resin can be obtained.

Examples of the polyether polyol include polyether polyols obtained by adding one or a mixture of alkylene oxides (such as ethylene oxide, propylene oxide, butylene oxide, cyclohexene oxide, and styrene oxide) to one or a mixture of polyvalent hydroxy compounds using a hydroxide (such as lithium, sodium, or potassium), a strongly basic catalyst (such as alcoholate or alkylamine), or a composite metal cyan compound complex (such as a metal porphyrin or zinc hexacyanocobaltate complex) through random addition or block addition; polyether polyols obtained by reacting alkylene oxide with a polyamine compound (such as ethylene diamines); and so-called polymer polyols obtained by polymerizing acrylamide and the like using these polyether polyols as a medium.

Examples of the polyvalent hydroxy compound include (i) diglycerin, ditrimethylolpropane, pentaerythritol, and dipentaerythritol; (ii) sugar alcohol-based compounds such as erythritol, D-threitol, L-arabinitol, ribitol, xylitol, sorbitol, mannitol, galactitol, and ramnitol; (iii) monosaccharides such as arabinose, ribose, xylose, glucose, mannose, galactose, fructose, sorbose, rhamnose, fucose, and ribodesose; (iv) disaccharides such as trehalose, sucrose, maltose, cellobiose, gentiobiose, lactose, and melibiose; (v) trisaccharides such as raffinose, gentianose, and melezitose; and (vi) tetrasaccharides such as stachyose.

The acrylic polyol can be obtained by, for example, copolymerizing a polymerizable monomer having one or more active hydrogens in a molecule and another monomer which can be copolymerized with the polymerizable monomer.

The acrylic polyol can be obtained by, for example, copolymerizing one or more selected from the group consisting of (meth)acrylic acid esters (such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, cyclohexyl methacrylate, lauryl methacrylate, and glycidyl methacrylate), unsaturated carboxylic acids (such as acrylic acid, methacrylic acid, maleic acid, and itaconic acid), unsaturated amides (such as acrylamide, N-methylolacrylanmide, and diacetone acrylamide), vinyl monomers containing a hydrolyzable silyl group (such as vinyltrimethoxysilane, vinylmethyldimethoxysilane, and γ-(meth)acrylopropyltrimethoxysilane), and other polymerizable monomers (such as styrene, vinyl toluene, vinyl acetate, acrylonitrile, and dibutyl fumarate), as necessary, according to a method of the related art using one or more selected from the group consisting of acrylic acid esters having active hydrogen (such as 2-hydroxyethyl acrylate, 2-hydroxypropyl acrylate, and 2-hydroxybutyl acrylate) or methacrylic acid esters having active hydrogen (such as 2-hydroxyethyl methacrylate, 2-hydroxypropyl methacrylate, 2-hydroxybutyl methacrylate, 3-hydroxypropyl methacrylate, and 4-hydroxybutyl methacrylate), and (meth)acrylic acid esters having polyvalent active hydrogen such as (meth)acrylic acid monoester of a triol such as glycerin or trimethylolpropane; monoether of polyether polyols (such as polyethylene glycol, polypropylene glycol, and polybutylene glycol) and the above-described (meth)acrylic acid esters having active hydrogen; an adduct of glycidyl (meth)acrylate and monobasic acid such as acetic acid, propionic acid, or p-tert-butylbenzoic acid; and an adduct obtained by performing ring-opening polymerization on lactones (such as ε-caprolactone or γ-caprolactone) with active hydrogen in the (meth)acrylic acid esters having active hydrogen, as indispensable components.

For example, an acrylic polyol can be obtained by performing solution polymerization on the above-described monomer components in the presence of a radical polymerization initiator such as a known peroxide or azo compound and diluting the resultant with an organic solvent or the like as necessary. The water-based acrylic polyol can be produced according to known methods such as a method of performing solution polymerization on an olefinically unsaturated compound and converting the resultant to a water layer or a method of performing emulsion polymerization. In this case, water solubility or water dispersibility can be imparted by neutralizing acidic moieties of sulfonic acid-containing monomers or carboxylic acid-containing monomers such as acrylic acid and methacrylic acid with an amine or ammonia.

The fluorine polyol indicates a polyol having fluorine in a molecule, and examples thereof include copolymers such as fluoroolefin, cyclovinyl ether, hydroxyalkyl vinyl ether, and monocarboxylic acid vinyl ester disclosed in Japanese Unexamined Patent Application, First Publication No. S57-34107 and Japanese Unexamined Patent Application, First Publication No. S61-215311.

The hydroxyl value of the polyol is not particularly limited, but is preferably in a range of 10 to 200 mgKOH/g. The lower limit thereof is more preferably 20 mgKOH/g and still more preferably 30 mgKOH/g. The acid value of the polyol is preferably in a range of 0 to 30 mgKOH/g. The hydroxyl value and the acid value can be measured in conformity with JIS K 1557.

Among examples of the polyol, an acrylic polyol is preferable as the polyol from the viewpoints of the weather resistance, the chemical resistance, and the hardness and a polyester polyol is preferable as the polyol from the viewpoints of mechanical strength and oil resistance.

The equivalent ratio (NCO/OH ratio) of the isocyanate group of the polyisocyanate mixture according to the present embodiment to the hydroxyl group of the compound having two or more active hydrogens in a molecule is preferably in a range of 0.2 to 5.0, more preferably in a range of 0.4 to 3.0, and still more preferably in a range of 0.5 to 2.0. In a case where the equivalent ratio thereof is 0.2 or greater, a stronger coating film can be obtained. In a case where the equivalent ratio is 5.0 or less, the smoothness of the coating film can be further improved.

A melamine-based curing agent such as complete alkyl, methylol type alkyl, or imino group type alkyl can be added to the coating composition.

The compound having two or more active hydrogens in a molecule, the polyisocyanate mixture of the present embodiment, and the coating composition of the present embodiment each can be used by being mixed an organic solvent. Preferred examples of the organic solvent include those which do not contain functional groups reacting with a hydroxyl group and an isocyanate group. Other preferred examples thereof include those which are compatible with a polyisocyanate mixture. Examples of such an organic solvent include an ester compound, an ether compound, a ketone compound, an aromatic compound, an ethylene glycol dialkyl ether-based compound, a polyethylene glycol dicarboxylate-based compound, a hydrocarbon-based solvent, and an aromatic solvent, which have been typically used as coating solvents.

The compound having two or more active hydrogens in a molecule, the polyisocyanate mixture of the present embodiment, and the coating composition of the present embodiment each can be used by being mixed with various additives which have been used in the technical field, such as catalysts, pigments, leveling agents, antioxidants, ultraviolet absorbing agents, light stabilizers, plasticizers, and surfactants according to the intended purpose or the applications thereof within the range not impairing the effects of the present embodiment.

Examples of the catalyst for promoting curing include metal salts such as dibutyltin dilaurate, tin 2-ethylhexanoate, zinc 2-ethylhexanoate, and cobalt salt; and tertiary amines such as trimethylamine, pyridine, methylpyridine, benzyldimethylamine, N,N-dimethylcyclohexylamine, N-methylpiperidine, pentamethyl diethylenetriamine, N,N-endoethylenepiperazine, and N,N-dimethylpiperazine.

The coating composition of the present embodiment can be used as a coating material for roll coating, curtain flow coating, spray coating, bell coating, or electrostatic coating. For example, the coating composition is useful as a primer or a top and intermediate coating material for materials such as metals (a steel plate, a surface-treated steel plate, and the like), plastic, wood, films, or inorganic materials. Further, the coating composition is also useful as a coating material for imparting decorativeness, weather resistance, acid resistance, rust preventing properties, and chipping resistance to precoated metal containing a rust preventive steel plate or automobile coating. Further, the coating composition is also useful as a urethane raw material such as an adhesive, a pressure sensitive adhesive, an elastomer, foam, or a surface treatment agent.

<<Coating Film>>

A coating film of the present embodiment is obtained by curing the coating composition of the present embodiment.

Hereinafter, preferred embodiments of the polyisocyanate mixture will be described.

First Embodiment

According to a first embodiment, the polyisocyanate (B) is polyisocyanate (B1) having a number average molecular weight of 850 to 5000, which is obtained from at least one diisocyanate selected from the group consisting of aliphatic diisocyanates.

The lower limit of the number average molecular weight of the polyisocyanate (B1) used in the first embodiment is preferably 900 and more preferably 950. Further, the upper limit of the number average molecular weight is more preferably 4000, still more preferably 2000, and even still more preferably 1500. In a case where the number average molecular weight is 850 or greater, the solvent resistance tends to become sufficient. Further, in a case where the number average molecular weight is 5000 or less, the low viscosity can be maintained. The number average molecular weight can be measured according to the method described in the following examples.

The NCO content of the polyisocyanate mixture according to the first embodiment is preferably in a range of 5% by mass to 50% by mass. The lower limit of the NCO content is more preferably 10% by mass and still more preferably 15% by mass. The upper limit of the NCO content is more preferably 45% by mass and still more preferably 40% by mass. In a case where the NCO content is in the above-described range, the curability tends to become sufficient. The NCO content can be measured according to the method described in the following examples.

The viscosity of the polyisocyanate mixture according to the first embodiment at 25° C. is preferably in a range of 200 mPa·s to 15000 mPa·s. The lower limit thereof is more preferably 300 mPa·s and still more preferably 350 mPa·s. The upper limit thereof is more preferably 12000 mPa·s, still more preferably 10000 mPa·s, and even still more preferably 8000 mPa·s. In a case where the viscosity is in the above-described range, the compatibility with an active hydrogen compound serving as a main agent tends to be improved. The viscosity can be measured according to the method described in the following examples.

The average number of isocyanate groups in the polyisocyanate mixture according to the first embodiment is preferably in a range of 3.2 to 8. The lower limit thereof is more preferably 3.3, still more preferably 3.4, and even still more preferably 3.5. The upper limit thereof is more preferably 6.0 and still more preferably 5.0. In a case where the average number of isocyanate groups is 3.2 or greater, the solvent resistance tends to be maintained. Further, in a case where the average number thereof is 8 or less, the compatibility tends to be maintained. The average number of isocyanate groups can be measured according to the method described in the following examples.

The content of the triisocyanate compound (A) represented by Formula (I) in the polyisocyanate mixture according to the first embodiment is preferably in a range of 10% by mass to 90% by mass. The lower limit thereof is more preferably 20% by mass and still more preferably 30% by mass. The upper limit thereof is more preferably 80% by mass and even still more preferably 70% by mass. In a case where the content of the triisocyanate compound (A) is in the above-described range, the compatibility with the active hydrogen compound, the recoat adhesiveness, the curability, and the solvent resistance tend to be well-balanced.

<Hydroxyl Group-Containing Compound Component>

It is preferable that the polyisocyanate (B1) used in the first embodiment contains a hydroxyl group-containing compound component in a part thereof. Further, it is preferable that the polyisocyanate (B1) of the first embodiment has an allophanate structure. The hydroxyl group-containing compound component indicates a moiety derived from a hydroxyl group-containing compound constituting a part of polyisocyanate. From the viewpoint of improving the compatibility with the active hydrogen compound at the time of obtaining the coating composition and the curability, a diol or a triol is preferable as the hydroxyl group-containing compound constituting the allophanate structure in the polyisocyanate mixture. At the time of production of polyisocyanate, the hydroxyl group of a diol or a triol reacts with the isocyanate group and a desorption material is not generated during this reaction. Therefore, the mass of the diol and the triol added as a raw material does not decrease and the diol and the triol constitute a part of the polyisocyanate as a diol component and a triol component.

In the polyisocyanate (B1) used in the first embodiment, it is preferable that a polyol containing a bifunctional or higher functional hydroxyl group, a polyol containing a trifunctional or higher functional hydroxyl group, and a polyester polyol containing a trifunctional or higher functional hydroxyl group are used as a raw material.

Examples of the diol, which are not limited to the followings, include linear aliphatic diols such as ethylene glycol, 1,3-propanediol, 1,2-propanediol, 1,3-butanediol, 1,4-butanediol, 2,3-butanediol, 1,5-pentanediol, 1,2-pentanediol, 1,3-pentanediol, 1,4-pentanediol, neopentyl glycol, 1,6-hexanediol, 1,7-heptanediol, 1,8-octanediol, 1,9-nonanediol, 1,10-decanediol, diethylene glycol, polyethylene glycol, polypropylene glycol, and polytetramethylene glycol; and branched aliphatic diols such as 2-methyl-1,3-propanediol, 3-methyl-1,5-pentanediol, 2-methyl-1,8-octanediol, and 2,2-diethyl-1,3-propanediol.

From the viewpoint of suppressing the crystallinity, branched aliphatic diols are preferably exemplified. These may be used alone or in combination of two or more kinds thereof. The lower limit of the number of carbon atoms in a diol is preferably 2, more preferably 3, and still more preferably 4. In a case where the number of carbon atoms in a diol is 2 or greater, the average number of isocyanate groups is increased, and the curability and drying properties tend to be further improved. In addition, the upper limit thereof is preferably 10, more preferably 8, still more preferably 6, and even still more preferably 5. In a case where the number of carbon atoms in a diol is 10 or less, the compatibility is further improved, and the appearance of the coating film tends to be further improved.

The triol is not particularly limited to the followings, and examples thereof include glycerin, trimethylolpropane, and derivatives of these. In a case where the polyisocyanate contains a triol component, the curability due to the reaction with a polyvalent active hydrogen compound serving as a main agent tends to be improved.

Further, the polyisocyanate (B1) may contain a polyol component containing four or more hydroxyl groups and a monoalcohol component containing one hydroxyl group, in a part thereof.

The concentration of the hydroxyl group-containing compound component constituting the polyisocyanate (B1) used in the first embodiment is not particularly limited, but is preferably in a range of 1% to 20% by mass with respect to the total concentration of the polyisocyanate (B1). The lower limit thereof is more preferably 2% by mass, still more preferably 3% by mass, even still more preferably 4% by mass, and even still more preferably 5% by mass. Further, the upper limit thereof is more preferably 18% by mass, still more preferably 16% by mass, and even still more preferably 14% by mass. In a case where the concentration of the hydroxyl group-containing compound component is 1% by mass or greater, the compatibility with the polyvalent active hydrogen compound serving as a main agent is further improved. Further, in a case where the concentration thereof is 20% by mass or less, a coating film having excellent weather resistance can be obtained.

<<Method of Producing Polyisocyanate (B1)>>

It is preferable that the polyisocyanate (B1) used in the first embodiment has at least an isocyanurate bond and may further have other bonds without particular limitation such as a biuret bond, a urea bond, an uretdione bond, a urethane bond, an allophanate bond, an iminooxadiazine dione bond, and an oxadiazine trion bond.

The polyisocyanate (B1) having an isocyanurate bond is obtained by performing a cyclic trimerization reaction using a catalyst or the like, stopping the reaction at the time of the conversion rate reaching approximately 5% to 80% by mass, and removing and purifying unreacted diisocyanate. In the first embodiment, monovalent to hexavalent compounds such as polycaprolactone polyol, 1,3-butanediol, and trimethylolpropane can be used in combination.

As the catalyst used for production of the polyisocyanate (B1) having an isocyanurate bond, a catalyst having a basicity is preferable. Examples of such a catalyst include (1) hydroxides of tetraalkylammonium such as tetramethyl-ammonium, tetraethylammonium, tetrabutylammonium, or trimethylbenzylammonium, and organic weak acid salts such as acetic acid and capric acid, (2) hydroxides of hydroxyalkylammonium such as trimethylhydroxypropylammonium, trimethylhydroxyethylammonium, triethylhydroxypropylammonium or triethylhydroxyethylanmnonium, and organic weak acid salts such as acetic acid and capric acid, (3) alkyl metal salts such as tin, zinc, and lead of alkylcarboxylic acid, (4) metal alcoholates of sodium, potassium, and the like, (5) aminosilyl group-containing compounds such as hexamethyldisilazane, (6) Mannich bases, (7) combinations of tertiary amines and epoxy compounds, and (8) phosphorus compounds such as tributylphosphine, and these may be used in combination of two or more kinds thereof.

In a case where the catalyst may adversely affect the coating material or physical properties of the coating film, it is preferable that the catalyst is neutralized with an acidic compound or the like. The acidic compound in this case is not particularly limited, and examples thereof include an inorganic acid such as hydrochloric acid, phosphorous acid, or phosphoric acid; sulfonic acid such as methanesulfonic acid, p-toluenesulfonic acid, p-toluenesulfonic acid methyl ester, or p-toluenesulfonic acid ethyl ester or derivatives of these; ethyl phosphate, diethyl phosphate, isopropyl phosphate, diisopropyl phosphate, butyl phosphate, dibutyl phosphate, 2-ethylhexyl phosphate, di(2-ethylhexyl) phosphate, isodecyl phosphate, diisodecyl phosphate, oleyl acid phosphate, tetracosyl acid phosphate, ethyl glycol acid phosphate, butyl pyrophosphate, and butyl phosphite. Further, these may be used in combination of two or more kinds thereof.

According to the first embodiment, it is possible to provide a polyisocyanate mixture having excellent compatibility with an active hydrogen compound serving as a main agent, recoat adhesiveness, and solvent resistance of the obtained coating film while holding the curability.

Second Embodiment

In a second embodiment, the polyisocyanate (B) is aromatic diisocyanate (B2-1) or polyisocyanate (B2-2) (hereinafter, also referred to as "aromatic diisocyanate-derived polyisocyanate (B2-2)") derived from aromatic diisocyanate, and an expression of a/(a+b+c) in a case where each mol % of an isocyanurate structure, a urethane structure, and an allophanate structure in the polyisocyanate (B2-2) is set as a, b, and c is 0.10 or greater.

Aromatic Diisocyanate (B2-1)

Examples of the aromatic diisocyanate (B2-1) used as the polyisocyanate (B) in the second embodiment include 2,4-tolylene diisocyanate, 2,6-tolylene diisocyanate, 4,4'-diphenylmethane diisocyanate, naphthalene diisocyanate, and xylylene diisocyanate (hereinafter, referred to as XDI). Among these, from the viewpoint of ease of industrial availability, 2,4-tolylene diisocyanate, 2,6-tolylene diisocyanate, and 4,4'-diphenylmethane diisocyanate are desirable. From the viewpoint of weather resistance, XDI is preferable. The aromatic diisocyanate (B2-1) may be used alone or in combination of two or more kinds thereof.

In the polyisocyanate (B) used in the second embodiment, the proportion of the aromatic diisocyanate (B2-1) and the aromatic diisocyanate-derived polyisocyanate (B2-2) is not particularly limited, and the proportion of the aromatic diisocyanate-derived polyisocyanate (B2-2) is preferably 20% by mass or greater, more preferably 33% by mass or greater, particularly preferably 50% by mass or greater, and even still more preferably 66% by mass or greater. In a case where the proportion of the aromatic diisocyanate-derived polyisocyanate (B2-2) is set to be greater than or equal to the lower limit of the above-described range, the solvent resistance can be increased.

It is preferable that the expression of a/(a+b+c) in a case where each mol % of an isocyanurate structure, a urethane structure, and an allophanate structure in the polyisocyanate (B) used in the second embodiment is set as a, b, and c is 0.10 or greater (condition (i-2)).

Further, in the triisocyanate compound (A) used in the second embodiment, it is preferable that at least one of the plurality of $Y^1$'s in Formula (I) has an ester structure (condition (ii-2)).

It is preferable that the polyisocyanate mixture of the second embodiment satisfies any one or both of the condition (i-2) and the condition (ii-2).

The lower limit of the proportion is preferably 0.17, more preferably 0.25, particularly preferably 0.30, and even still more preferably 0.40. In a case where the proportion is greater than or equal to the lower limit, the recoat adhesiveness tends to be further improved.

According to the second embodiment, it is preferable that the polyisocyanate in the polyisocyanate (B) has an isocyanurate structure as a constituent component. The isocyanurate structure is represented by Formula (II).

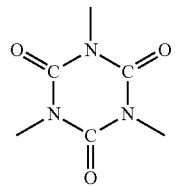

(II)

The polyisocyanate in the polyisocyanate (B) used in the second embodiment may have a urethane structure and an allophanate structure in addition to the isocyanurate structure.

The urethane structure is formed of a hydroxyl group of alcohol and an isocyanate group, and the allophanate structure is formed of a urethane structure and an isocyanate group. These structures are represented by Formulae (III) and (IV).

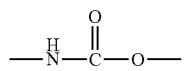

(III)

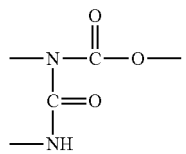

(IV)

As the alcohol which can be used for the polyisocyanate in the polyisocyanate (B) used in the second embodiment, alcohol formed of only carbon, hydrogen, and oxygen is preferable, and it is preferable to use a diol or a triol in order to increase the average number of isocyanate groups. It is preferable that a polyol containing three or fewer hydroxyl groups in a molecule is used because the viscosity of the obtained polyisocyanate can be adjusted to be in a suitable range.

The number average molecular weight of the polyisocyanate (B) used in the second embodiment is not particularly limited, but is preferably in a range of 100 to 2000. The lower limit of the number average molecular weight is more preferably 300 and particularly preferably 500. The upper limit of the number average molecular weight is preferably 1800, more preferably 1600, and still more preferably 1500.

In a case where the number average molecular weight thereof is less than or equal to the upper limit, the ground opacifying properties of the coating film to be obtained tend to be improved. The number average molecular weight can be acquired by gel permeation chromatography (GPC). Specifically, the number average molecular weight can be measured according to the method described in the following examples.

The mixing ratio (A)/(B) of the triisocyanate (A) to the polyisocyanate (B) used in the second embodiment is not particularly limited, but is preferably in a range of 95/5 to 5/95 in terms of the mass ratio.

The upper limit thereof is more preferably 90/10, more preferably 80/20, and particularly preferably 70/30. The lower limit thereof is more preferably 10/90, more preferably 20/80, and particularly preferably 30/70. In a case where the mixing ratio is less than or equal to the upper limit of the above-described range, the drying properties tend to be further improved. In a case where the mixing ratio is greater than or equal to the lower limit of the above-described range, the recoat adhesiveness tends to be further improved.

The average number of isocyanate groups in the polyisocyanate mixture according to the second embodiment is not particularly limited, but is preferably 2.5 or greater, more preferably 2.6 or greater, particularly preferably 2.7 or greater, and even still more preferably 2.8 or greater. In a case where the average number thereof is greater than or equal to the lower limit of the above-described range, the solvent resistance can be held.

Third Embodiment

In a third embodiment, the polyisocyanate (B) is a polyisocyanate (B3) derived from alicyclic diisocyanate, and an expression of a/(a+b+c) in a case where each mol % of an isocyanurate structure, a urethane structure, and an allophanate structure in the polyisocyanate (B3) is set as a, b, and c is preferably 0.10 or greater.

According to the second embodiment, it is possible to provide a polyisocyanate mixture having excellent drying properties, impact resistance, solvent resistance, recoat adhesiveness, and sagging resistance.

<Polyisocyanate (B3)>

The polyisocyanate (B) used in the third embodiment is polyisocyanate (B3) derived from alicyclic diisocyanate.

As such an alicyclic diisocyanate, alicyclic diisocyanate having 8 to 30 carbon atoms is preferably exemplified. Examples thereof include isophorone diisocyanate (hereinafter, abbreviated as "IPDI"), 1,3-bis(isocyanatomethyl)-cyclohexane, 4,4'-dicyclohexylmethane diisocyanate, norbornene diisocyanate, and hydrogenated xylylene diisocyanate. Among these, from the viewpoints of the weather resistance and ease of industrial availability, IPDI is preferable. The alicyclic diisocyanate may be used alone or in combination of two or more kinds thereof.

It is preferable that the expression of a/(a+b+c) in a case where each mol % of an isocyanurate structure, a urethane structure, and an allophanate structure in the polyisocyanate (B) used in the third embodiment is set as a, b, and c is 0.10 or greater (condition (i-3)).

Further, in the triisocyanate compound (A) used in the second embodiment, it is preferable that at least one of the plurality of $Y^1$'s in Formula (I) has an ester structure (condition (ii-3)).

The polyisocyanate mixture of the third embodiment satisfies any one and preferably both of the condition (i-3) and the condition (ii-3).

The lower limit of the proportion is preferably 0.17, more preferably 0.25, particularly preferably 0.30, and even still more preferably 0.40. In a case where the proportion is 0.10 or greater, the recoat adhesiveness tends to be further improved.

It is preferable that the polyisocyanate (B) used in the third embodiment has an isocyanurate structure as a constituent component. The isocyanurate structure is represented by Formula (II).

The polyisocyanate (B) used in the third embodiment may have a urethane structure and an allophanate structure in addition to the isocyanurate structure.

The urethane structure is formed of a hydroxyl group of alcohol and an isocyanate group, and the allophanate structure is formed of a urethane structure and an isocyanate group. These structures are represented by Formulae (III) and (IV).

As the alcohol which can be used in the polyisocyanate (B) used in the second embodiment, alcohol formed of only carbon, hydrogen, and oxygen is preferable, and a diol or a triol is more preferable from the viewpoint of increasing the average number of isocyanate groups. It is preferable that a polyol containing three or fewer hydroxyl groups in a molecule is used because the viscosity of the obtained polyisocyanate can be adjusted to be in a suitable range.

The number average molecular weight of the solid content in the polyisocyanate (B) used in the third embodiment is not particularly limited, but is preferably in a range of 400 to 2000. The lower limit of the number average molecular weight is more preferably 500 and still more preferably 600. The upper limit of the number average molecular weight is more preferably 1800, still more preferably 1600, and even still more preferably 1500.

In a case where the number average molecular weight thereof is set to 400 or greater, the yield of the polyisocyanate mixture to be obtained tends to be further improved. In a case where the number average molecular weight thereof is set to 2000 or less, the ground opacifying properties of the coating film to be obtained tend to be improved. The number average molecular weight can be acquired by gel permeation chromatography (GPC). Specifically, the number average molecular weight can be measured according to the method described in the following examples.

The mixing ratio (A)/(B) of the triisocyanate (A) to the polyisocyanate (B) used in the third embodiment is not particularly limited, but is preferably in a range of 95/5 to 5/95 in terms of the mass ratio.

The upper limit thereof is more preferably 90/10, more preferably 80/20, and particularly preferably 70/30.

The lower limit thereof is more preferably 10/90, still more preferably 20/80, and particularly preferably 30/70. In a case where the mixing ratio is 95/5 or less, the drying properties tend to be further improved. In a case where the mixing ratio is 5/95 or greater, the recoat adhesiveness tends to be further improved.

According to the third embodiment, it is possible to provide a polyisocyanate mixture having excellent drying properties, chemical resistance, recoat adhesiveness, weather resistance, and sagging resistance.

Fourth Embodiment

According to a fourth embodiment, it is preferable that the polyisocyanate (B) is polyisocyanate (B4) which is obtained from aliphatic diisocyanate containing at least 1,6-diisocyanatohexane and in which an expression of (a+b)/(a+b+c+d+e+f) in a case where each mol % of an uretdione structure, an iminooxadiazine dione structure, an isocyanurate structure, an allophanate structure, a urethane structure, and a biuret structure is set as a, b, c, d, e, and f is in a range of 0.02 to 0.50.

In the fourth embodiment, the lower limit of the proportion is preferably 0.05, more preferably 0.08, and still more preferably 0.10. The upper limit thereof is preferably 0.40, more preferably 0.35, and still more preferably 0.30. In a case where the proportion is less than 0.02, the adhesiveness to the ground coating film tends to be degraded. Further, in a case where the proportion is greater than 0.50, the drying properties tend to be degraded.

In the fourth embodiment, the number of carbon atoms of the aliphatic diisocyanate is preferably in a range of 4 to 30, and examples thereof include 1,4-diisocyanatobutane, 1,5-diisocyanatopentane, HDI, 2,2,4-trimethyl-1,6-diisocyanatohexane, 2-methylpentane-1,5-diisocyanate (MPDI), and lysine diisocyanate. Among these, from the viewpoint of ease of industrial availability, HDI is preferable. The aliphatic diisocyanate may be used alone or in combination of two or more kinds thereof.

The polyisocyanate (B) used in the fourth embodiment may partially contain alicyclic diisocyanate. The number of carbon atoms of the alicyclic diisocyanate is preferably in a range of 8 to 30, and examples thereof include isophorone diisocyanate (hereinafter, abbreviated as "IPDI"), 1,3-bis (isocyanatomethyl)-cyclohexane, 4,4'-dicyclohexylmethane diisocyanate, and norbornene diisocyanate. Among these, from the viewpoints of the weather resistance and ease of industrial availability, IPDI is preferable. The alicyclic diisocyanate may be used alone or in combination of two or more kinds thereof.

Among these diisocyanates, from the viewpoints of ease of industrial availability and the reactivity at the time of producing polyisocyanate, HDI is more preferable.

It is preferable that the polyisocyanate (B) used in the fourth embodiment has an uretdione structure as a constituent component. The uretdione structure is polyisocyanate formed of two molecules of diisocyanate monomers and is represented by Formula (V).

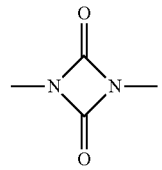

(V)

As a method of generating an uretdione structure, two methods, which are a method of generating an uretdione structure using an uretdione-forming reaction catalyst and a heating method are exemplified. Examples of the uretdione-forming reaction catalyst include tertiary phosphines, for example, trialkyl phosphine such as tri-n-butylphosphine or tri-n-octylphosphine, tris(dialkylamino)phosphine such as tris-(dimethylamino)phosphine, and cycloalkyl phosphine such as cyclohexyl-di-n-hexylphosphine. Most of these compounds simultaneously promote an isocyanurate-forming reaction to generate isocyanurate structure-containing polyisocyanate in addition to uretdione structure-containing polyisocyanate. A deactivating agent of the uretdione-formation reaction catalyst such as phosphoric acid or methyl paratoluene sulfonate is added at the time of obtaining a desired yield so that the uretdione-formation reaction is stopped.

Further, the heating method is a method of carrying out a reaction while stirring in a temperature range of 140° C. to 160° C. for 0.2 hours to 6 hours. In this case, the reaction time is preferably 0.5 hours or longer and more preferably 1.0 hours or longer. Further, the reaction time is preferably 4.0 hours or shorter and more preferably 3.0 hours or shorter.

In a case where the reaction time is set to be longer than or equal to the lower limit of the above-described range, it is possible to generate a sufficient amount of the uretdione structure. Further, in a case where the reaction time is shorter than or equal to the upper limit of the above-described range, coloration of polyisocyanate can be suppressed.

It is preferable that the polyisocyanate (B) used in the fourth embodiment has an iminooxadiazine dione structure as a constituent component. The iminooxadiazine dione structure is polyisocyanate formed of three molecules of diisocyanate monomers and is represented by Formula (III).

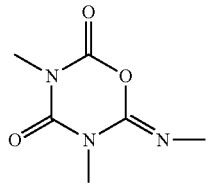

(VI)

According to the method of generating the iminooxadiazine dione structure, the following (1) and (2) which have been known as a typical iminooxadiazine dione-forming catalyst can be used.

(1) (Poly)hydrogen fluoride represented by Formula $M[F_n]$ or $M[F_n(HF)_m]$, such as a tetramethylammonium fluoride hydrate or tetraethylammonium fluoride (in the formulae, m and n represents an integer satisfying the relationship of "m/n>0", and M represents an n-charged cation (mixture) or one or more radicals having a total of n valence)

(2) A compound formed of 3,3,3-trifluorocarboxylic acid; 4,4,4,3,3-pentafluorobutanoic acid; 5,5,5,4,4,3,3-heptafluoropentanoic acid; Formula $R^1$—$CR'_2$—$C(O)O$— such as 3,3-difluoroprop-2-enoic acid or Formula $R^2$=$CR'$—$C(O)O$— (in the formulae, $R^1$ and $R^2$ represent a branched, cyclic, and/or unsaturated perfluoroalkyl group having 1 to 30 carbon atoms as necessary, and (R')'s may be the same as or different from each other, are selected from the group consisting of a hydrogen atom, an alkyl group having 1 to 20 carbon atoms, and an aryl group, and contain heteroatoms as necessary), a quaternary ammonium cation, or a quaternary phosphonium cation From the viewpoint of ease of availability, the above-described (1) is preferable. Further, from the viewpoint of the safety, the above-described (2) is preferable.

The amount of these catalysts to be used is preferably in a range of 10 ppm to 1000 ppm with respect to the mass of the added diisocyanate. The lower limit thereof is preferably 20 ppm or greater, more preferably 40 ppm or greater, and particularly preferably 80 ppm or greater.

The upper limit thereof is preferably 800 ppm or less, more preferably 600 ppm or less, and particularly preferably 500 ppm or less.

Further, the reaction temperature is preferably in a range of 40° C. to 120° C. The lower limit of the temperature is more preferably 50° C. or higher and more preferably 55° C. or higher.

Further, the upper limit of the temperature is preferably 100° C. or lower, more preferably 90° C. or lower, and particularly preferably 80° C. or lower.

In a case where the reaction temperature is higher than or equal to the lower limit of the above-described range, the reaction rate can be maintained. Further, in a case where the reaction temperature is lower than or equal to the upper limit of the above-described range, the coloration of the polyisocyanate can be suppressed.

The polyisocyanate (B) used in the fourth embodiment may have an isocyanurate structure, an allophanate structure, a urethane structure, and a biuret structure as a constituent component. The isocyanurate structure, the allophanate structure, the urethane structure, and the biuret structure are each represented by Formulae (II), (IV), (III), and (VII).

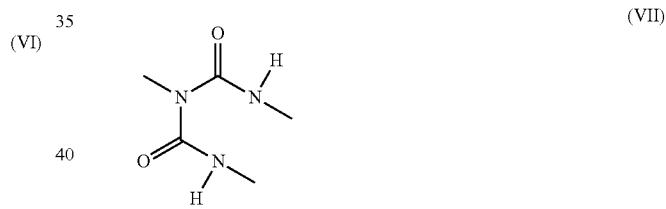

(VII)

The concentration of the diisocyanate monomer in the polyisocyanate (B) used in the fourth embodiment is preferably 1% by mass or less, more preferably 0.5% by mass or less, particularly preferably 0.3% by mass or less, and even still more preferably 0.2% by mass or less. In a case where the concentration thereof is 1% by mass or less, there is no concern that the crosslinking properties are degraded.

The viscosity of the polyisocyanate (B) used in the fourth embodiment at 25° C. is not particularly limited, but is preferably in a range of 100 to 4000 mPa·s.

The lower limit thereof is more preferably 150 mPa·s or greater and particularly preferably 200 mPa·s or greater.

The upper limit thereof is preferably 3000 mPa·s or less, more preferably 2000 mPa·s or less, particularly preferably 1000 mPa·s or less, and even still more preferably 700 mPa·s or less.

In a case where the concentration thereof is greater than or equal to the lower limit of the above-described range, there is no concern that the drying properties are degraded. Further, in a case where the concentration thereof is lower than or equal to the upper limit of the above-described range, there is no concern that a decrease in viscosity becomes insufficient. The viscosity can be measured using an E type viscometer (manufactured by Tokimec. Inc.).

The number average molecular weight of the solid content in the polyisocyanate (B) used in the fourth embodiment is not particularly limited, but is preferably in a range of 400 to 1200.

The lower limit of the number average molecular weight thereof is preferably 440 or greater and more preferably 480 or greater.

The upper limit of the number average molecular weight thereof is preferably 1000 or less, more preferably 800 or less, and particularly preferably 700 or less.

In a case where the number average molecular weight thereof is greater than or equal to the lower limit of the above-described range, the yield of the polyisocyanate to be obtained is further improved.

In a case where the number average molecular weight thereof is less than or equal to the upper limit of the above-described range, the ground opacifying properties of the coating film to be obtained are improved. The number average molecular weight thereof can be acquired by gel permeation chromatography (GPC). Specifically, the number average molecular weight can be measured according to the method described in the following examples.

The mixing ratio (A)/(B) of the triisocyanate (A) to the polyisocyanate (B) used in the fourth embodiment is not particularly limited, but is preferably in a range of 95/5 to 5/95 in terms of the mass ratio.

The upper limit thereof is more preferably 90/10 and particularly preferably 80/20.

The lower limit thereof is more preferably 10/90 and particularly preferably 20/80. In a case where the mixing ratio is 95/5 or less, the adhesiveness to the ground coating film is further improved. Further, in a case where the mixing ratio is 5/95 or greater, the viscosity thereof is further decreased.

Further, in the polyisocyanate mixture obtained by mixing the triisocyanate (A) with the polyisocyanate (B) according to the fourth embodiment, it is preferable that the absolute amount of an uretdione dimer derived from aliphatic diisocyanate in the polyisocyanate mixture is in a range of 1% by mass to 40% by mass.

The lower limit thereof is more preferably 1.5% by mass or greater, particularly preferably 2.0% by mass or greater, even still more preferably 3.5% by mass or greater, and most preferably 5.0% by mass or greater.

The upper limit thereof is more preferably 30% by mass or less, more preferably 25% by mass or less, particularly preferably 20% by mass or less, and even still more preferably 15% by mass or less.

In a case where the absolute amount thereof is set to be greater than or equal to the lower limit thereof, the adhesiveness to the ground coating film can be exhibited. Further, in a case where the absolute amount thereof is set to be less than or equal to the upper limit, the drying properties can be exhibited.

The viscosity of the polyisocyanate mixture according to the fourth embodiment at 25° C. is not particularly limited, but is preferably in a range of 10 to 500 mPa·s.

The lower limit thereof is more preferably 20 mPa·s or greater particularly preferably 30 mPa·s or greater, and most preferably 50 mPa·s or greater.

The upper limit thereof is more preferably 450 mPa·s or less, particularly preferably 400 mPa·s or less, and most preferably 350 mPa·s or less.

In a case where the viscosity thereof is greater than or equal to the lower limit of the above-described range, both of the drying properties and the adhesiveness to the ground coating film tend to be achieved. Further, in a case where the viscosity thereof is lower than or equal to the upper limit of the above-described range, the viscosity can be further decreased. The viscosity can be measured using an E type viscometer (manufactured by Tokimec. Inc.).

According to the fourth embodiment, it is possible to provide a polyisocyanate mixture whose viscosity is low and which has excellent physical properties of the coating film such as the drying properties, the ground opacifying properties, and the adhesiveness to the ground coating film.

Hereinafter, the present embodiment will be described in more detail based on specific examples and comparative examples, but the present embodiment is not limited to the following examples and comparative examples within the range not imparting the scope of the present embodiment. The physical properties of the polyisocyanate mixture in the examples and comparative examples were measured in the following manners. Further, "part(s)" and "%" each indicate "part(s) by mass" and "% by mass" unless otherwise specified.

First Embodiment

[Measuring Method]
(Physical Property 1) NCO Content (% by Mass)

The NCO content (content of isocyanate group, % by mass) of a polyisocyanate mixture free from a solvent, obtained in the examples and comparative examples by removing unreacted diisocyanate therefrom was measured in the following manner.

1 to 3 g of the polyisocyanate mixture produced in a production example was weighed (W g) in a three-necked flask, and 20 mL of toluene was added thereto so that the polyisocyanate mixture was completely dissolved therein. Thereafter, 10 mL of a toluene solution containing 2 N of di-n-butylamine was added thereto, and the solution was fully mixed and was allowed to stand at room temperature for 15 minutes. Further, 70 mL of isopropyl alcohol was added to the solution, and the solution was fully mixed. The resulting solution was titrated with a 1 N hydrochloric acid solution (factor F) using an indicator, thereby obtaining a titration value of $V_2$ mL.

The same titration operation as described above was performed without using the polyisocyanate mixture, thereby obtaining a titration value of $V_1$ mL.

The NCO content of the polyisocyanate mixture was calculated using the following equation based on the obtained titration values $V_2$ mL and $V_1$ mL.

$$\text{NCO content} = (V_1 - V_2) \times F \times 42 / (W \times 1000) \times 100$$

(Physical Properties 2) Viscosity (mPa·s)

The viscosity of the polyisocyanate mixture at 25° C. was measured at 25° C. using an E type viscometer (manufactured by Tokimec. Inc.). During the measurement, a standard rotor (1°34'×R24) was used. The rotation speed was as follows.

100 rpm (in a case where the viscosity was less than 128 mPa·s)

50 rpm (in a case where the viscosity was 128 mPa·s or greater and less than 256 mPa·s)

20 rpm (in a case where the viscosity was 256 mPa·s or greater and less than 640 mPa·s)

10 rpm (in a case where the viscosity was 640 mPa·s or greater and less than 1280 mPa·s)

5 rpm (in a case where the viscosity was 1280 mPa·s or greater and less than 2560 mPa·s)

2.5 rpm (in a case where the viscosity was 2560 mPa·s or greater and less than 5120 mPa·s)

1.0 rpm (in a case where the viscosity was 5120 mPa·s or greater and less than 10240 mPa·s)

0.5 rpm (in a case where the viscosity was 10240 mPa·s or greater and less than 20480 mPa·s)

(Physical Property 3) Number Average Molecular Weight

The number average molecular weight of the polyisocyanate mixture and the polyisocyanate derived from diisocyanate was acquired by measurement according to gel permeation chromatograph (hereinafter, abbreviated as "GPC") using the following device based on the number average molecular weight in terms of polystyrene. The molecular weight of the polyisocyanate mixture was calculated from all detected peaks, and the number average molecular weight of the polyisocyanate derived from diisocyanate was calculated from all peaks from which the peaks of the triisocyanate compound were removed.

Device: "HLC-8120GPC" (trade name, manufactured by Tosoh Corporation)

Columns: "TSKgel Super H1000" (trade name, manufactured by Tosoh Corporation)×1

"TSKgel Super H2000" (trade name, manufactured by Tosoh Corporation)×1

"TSKgel Super H3000" (trade name, manufactured by Tosoh Corporation)×1

Carrier: Tetrahydrofuran

Detection Method: Differential Refractometer (Physical Property 4) Average Number of Isocyanate Groups The average number of isocyanate groups in the polyisocyanate mixture was calculated using the following equation based on the NCO content (physical property 1) and the number average molecular weight (physical property 3).

Average number of isocyanate groups=number average molecular weight×(NCO content/100)/42

(Evaluation 1) Curability

"Setalux 1753" (trade name, manufactured by Nuplex Resins, LLC, acrylic polyol, hydroxyl value of 138.6 mgKOH/resin g, solid content concentration of 70% by mass) and the polyisocyanate mixture were blended with each other such that the ratio of NCO to OH was set to 1.0, and the solid content concentration was adjusted to 50% by mass using butyl acetate to obtain an α coating solution.

A glass plate was coated with the obtained a coating solution such that the dried film thickness was set to 40 μm using an applicator, dried at 23° C. for 30 minutes, baked at 90° C. for 20 minutes, thereby obtaining a cured coating film.

The obtained cured coating film was allowed to stand at 23° C. for 1 hour, the Konig hardness thereof was measured at 23° C. using a pendulum hardness meter (manufactured by BYK Chemie GmbH), and the evaluation was performed based on the following criteria.

A: The Konig hardness was 80 or greater.
B: The Konig hardness was 70 or greater and less than 80.
C: The Konig hardness was 60 or greater and less than 70.
D: The Konig hardness was less than 60.

(Evaluation 2) Compatibility

"ACRYDIC A-801-P" (trade name, manufactured by DIC Corporation, acrylic polyol, hydroxyl value of 50.0 mgKOH/resin g, solid content concentration of 50% by mass) and the polyisocyanate mixture were blended with each other such that the ratio of NCO to OH was set to 1.0, and the solid content concentration was adjusted to 50% by mass using butyl acetate to obtain a β coating solution.

A glass plate was coated with the obtained β coating solution such that the dried film thickness was set to 40 μm using an applicator, dried at 23° C. for 30 minutes, baked at 90° C. for 20 minutes, thereby obtaining a cured coating film.

The obtained cured coating film was allowed to stand at 23° C. for 1 hour, and the transparency of the coating film was visually confirmed.

A: The coating film was transparent.
B: The coating film was slightly cloudy.
C: The coating film was opaque.

(Evaluation 3) Recoat Adhesiveness

"LUMIFLON LF-400" (trade name, manufactured by AGC, Inc., fluorine polyol, hydroxyl value of 44 mgKOH/resin g, solid content concentration of 50% by mass) and the polyisocyanate mixture were blended with each other such that the ratio of NCO to OH was set to 1.0, and the solid content concentration was adjusted to 50% by mass using butyl acetate to obtain a γ coating solution.

A mild steel plate was coated with the obtained γ coating solution such that the dried film thickness was set to 30 μm using an applicator, dried at 23° C. for 30 minutes, baked at 140° C. for 30 minutes, thereby obtaining a cured coating film. Further, the obtained cured coating film was coated with the γ coating solution such that the dried film thickness was set to 30 μm using an applicator, dried at 23° C. for 30 minutes, baked at 140° C. for 30 minutes, thereby obtaining a multilayer coating film. The adhesiveness test for the obtained multilayer coating film was performed in conformity with JIS K5600-5-6. The evaluation was performed based on the following criteria.

A: Any peeled coating film or floating was not found.
B: Less than the half of the peeled coating film was found.
C: More than the half of the peeled coating film was found.

(Evaluation 4)

A glass plate was coated with the a coating solution obtained in (evaluation 1) such that the dried film thickness was set to 40 μm using an applicator, dried at 23° C. for 30 minutes, baked at 140° C. for 30 minutes, thereby obtaining a cured coating film.

The obtained cured coating film was allowed to stand at 23° C. for 1 hour, and the state of the coating film after a cotton ball impregnated with xylene was placed on the coating film for 5 minutes was visually confirmed.

A: The state of the coating film was not changed.
B: The state of the coating film was slightly changed.
C: The state of the coating film was changed.

(Synthesis Example 1A) Synthesis of NTI 1060 g of 4-aminomethyl-1,8-octamethylenediamine (hereinafter, referred to as triamine) was dissolved in 1500 g of methanol in a four-necked flask equipped with a stirrer, a thermometer, and a gas introduction pipe, and 1800 ml of 35 mass % hydrochloric acid was gradually added dropwise thereto while cooling. The methanol and water were removed and concentrated under reduced pressure, and the resultant was dried at 60° C./5 mmHg for 24 hours, thereby obtaining triamine hydrochloride as a white solid. 650 g of the obtained triamine hydrochloride was formed into fine powder and was suspended in 5000 g of o-dichlorobenzene, the reaction solution was heated while stirring, phosgene was started to be blown into the reaction solution at a rate of 200 g/hr at the time of the temperature reaching 100° C., the temperature was continuously increased and held at 180° C., and phosgene was continuously blown into the reaction solution for 12 hours. The dissolved phosgene and the solvent were distilled off under reduced pressure, and vacuum distillation was carried out, thereby obtaining 420 g of 4-isocyanate methyl-1,8-octamethylene diisocyanate (hereinafter, referred to as "NTI") which was colorless and transparent and had a boiling point of 161° C. to 163° C./1.2 mmHg. The NCO content was 50.0% by weight.

(Synthesis Example 2A) Synthesis of LTI 122.2 g of ethanolamine, 100 ml of o-dichlorobenzene, and 420 ml of toluene were put into a four-necked flask equipped with a stirrer, a thermometer, and a gas introduction pipe, ice-cooled hydrogen chloride gas was introduced into the flask, and the ethanolamine was converted to hydrochloride. Next, 182.5 g of lysine hydrochloride was added thereto, the reaction solution was heated to 80° C., the ethanolamine hydrochloride was dissolved therein, and hydrogen chloride gas was introduced thereinto to obtain lysine dihydrochloride. Further, the hydrogen chloride gas was allowed pass therethrough at 20 to 30 ml/min, the reaction solution was heated to 116° C., and the temperature was maintained until water was not distilled off any longer. The generated reaction mixture was recrystallized in the mixed solution of methanol and ethanol to obtain 165 g of lysine β-aminoethylester trihydrochloride. 100 g of this lysine β-aminoethylester trihydrochloride was formed into fine powder and was suspended in 1200 ml of o-dichlorobenzene, the reaction solution was heated while stirring, phosgene was started to be blown into the reaction solution at a rate of 0.4 mol/hr at the time of the temperature reaching 120° C., and the temperature was held for 10 hours and then increased to 150° C. The suspension was almost dissolved. The resulting solution was cooled and filtered, the dissolved phosgene and the solvent were distilled off under reduced pressure, and vacuum distillation was carried out, thereby obtaining 80.4 g of LTI which was colorless and transparent and had a boiling point of 155° C. to 157° C./0.022 mmHg. The NCO content was 47.1% by weight.

(Synthesis Example 3A) Synthesis of GTI 275 g of glutamic acid hydrochloride, 800 g of ethanolamine hydrochloride, and 150 ml of toluene were put into a four-necked flask equipped with a stirrer, a thermometer, and a gas introduction pipe, ice-cooled hydrogen chloride gas was introduced into the flask, and the solution was heated and refluxed at 110° C. for 24 hours until azeotropy of water did not occur any longer while hydrogen chloride gas was blown into the flask. The generated reaction mixture was recrystallized in the mixed solution of methanol and ethanol to obtain 270 g of bis(2-aminoethyl)glutamate trihydrochloride. 85 g of this bis(2-aminoethyl)glutamate trihydrochloride was suspended in 680 g of o-dichlorobenzene, the reaction solution was heated while stirring, phosgene was started to be blown into the reaction solution at a rate of 0.8 mol/hr at the time of the temperature reaching 135° C., the temperature was held for 13 hours, the reaction product was filtered, concentrated under reduced pressure, and purified using a thin film evaporator, thereby obtaining 54 g of GTI. The NCO content was 39.8% by weight.

(Synthesis Example 4A) Synthesis of NTI Oligomer

A four-necked flask equipped with a stirrer, a thermometer, a reflux cooling pipe, and a nitrogen blowing pipe was prepared such that a nitrogen atmosphere was formed therein and charged with 100 g of NTI as a monomer, and the temperature was held at 90° C. for 2 hours. Thereafter, 5 mg of benzyltrimethylanmonium hydroxide serving as a catalyst containing 87.5% by mass of propylene glycol 1-monomethyl ether 2-acetate and 7.5% by mass of methanol was added to the flask to cause a reaction, dibutyl phosphoric acid was added thereto at the time of the conversion rate reaching 90%, and the reaction was stopped. As the result, an NTI oligomer whose NCO content was 34.9% by mass, viscosity at 25° C. was 5500 mPa·s, number average molecular weight was 590, and average number of isocyanate groups was 4.9 was obtained.

(Example 1A) Synthesis of P-1A

A four-necked flask equipped with a stirrer, a thermometer, a reflux cooling pipe, and a nitrogen blowing pipe was prepared such that a nitrogen atmosphere was formed therein and charged with 10 parts by mass of NTI and 90 parts by mass of DURANATE MFA-100, and the mixture was stirred at 50° C. for 1 hour. As the result, a polyisocyanate mixture P-1 A whose NCO content was 21.5% by mass, viscosity at 25° C. was 9120 mPa·s, and average number of isocyanate groups was 5.2 was obtained. The above-described (evaluation 1) to (evaluation 4) were performed on the obtained polyisocyanate mixture P-1. The values of the physical properties and the evaluation results are listed in Table 1.

Examples 2A to 9A and Comparative Examples 1A to 2A

Polyisocyanate mixtures P-2A to P-9A and P-10A to P-11A were obtained in the same manner as in Example 1A except that the formulations in Examples 2A to 9A and Comparative Examples 1A and 2A were made as listed in Table 1. The values of the physical properties and the evaluation results of the obtained polyisocyanate mixtures are listed in Table 1.

Comparative Example 3A

The above-described (evaluation 1) to (evaluation 4) were performed on the NTI oligomer obtained in Synthesis Example 4A. The values of the physical properties and the evaluation results of the NTI oligomer are listed in Table 1.

TABLE 1

| | | Example 1A | Example 2A | Example 3A | Example 4A | Example 5A | Example 6A |
|---|---|---|---|---|---|---|---|
| Triisocyanate compound represented by Formula (I) | NTI | 10 | 30 | 50 | | | |
| | LTI | | | | 20 | 40 | 60 |
| | GTI | | | | | | |
| HDI-based polyisocyanate | MFA-100 *1 | 90 | 70 | 50 | 80 | 60 | 40 |
| | TFD-100 *2 | | | | | | |
| | TKA-100 *3 | | | | | | |

TABLE 1-continued

|  |  | Example 1A | Example 2A | Example 3A | Example 4A | Example 5A | Example 6A |
|---|---|---|---|---|---|---|---|
|  | HDI-based isocyanurate trimer (wt %) | 18 | 18 | 18 | 18 | 18 | 18 |
|  | NTI oligomer |  |  |  |  |  |  |
| NCO content | Wt % | 21.5 | 27.8 | 34.2 | 24.1 | 29.8 | 35.6 |
| Viscosity | mPa · s/25° C. | 9120 | 1720 | 320 | 5460 | 1420 | 370 |
| Average number of isocyanate groups |  | 4.6 | 3.8 | 3.4 | 4.1 | 3.6 | 3.3 |
| Curability |  | B | B | B | A | B | B |
| Compatibility |  | B | A | A | B | A | A |
| Recoat adhesiveness |  | B | A | A | A | A | A |
| Solvent resistance |  | A | A | B | A | A | B |

|  |  | Example 7A | Example 8A | Example 9A | Comparative Example 1A | Comparative Example 2A | Comparative Example 3A |
|---|---|---|---|---|---|---|---|
| Triisocyanate compound represented by Formula (I) | NTI |  |  |  |  |  |  |
|  | LTI |  |  |  | 40 |  |  |
|  | GTI | 10 | 30 | 50 |  |  |  |
| HDI-based polyisocyanate | MFA-100 *1 |  |  |  | 100 |  |  |
|  | TFD-100 *2 | 90 | 70 | 50 |  |  |  |
|  | TKA-100 *3 |  |  |  |  | 60 |  |
|  | HDI-based isocyanurate trimer (wt %) | 21 | 21 | 21 | 18 | 55 |  |
|  | NTI oligomer |  |  |  |  |  | 100 |
| NCO content | Wt % | 21.1 | 25.2 | 29.4 | 18.3 | 31.9 | 34.9 |
| Viscosity | mPa · s/25° C. | 7970 | 2580 | 840 | 21000 | 420 | 5500 |
| Average number of isocyanate groups |  | 4.2 | 3.7 | 3.4 | 5.4 | 3.1 | 4.9 |
| Curability |  | A | B | C | B | D | B |
| Compatibility |  | B | A | A | C | A | B |
| Recoat adhesiveness |  | B | A | A | C | A | B |
| Solvent resistance |  | A | A | B | A | C | C |

In Table 1, "MFA-100", "TFD-100", and "TKA-100" indicate the following materials.

1 MFA-100: HDI-based polyisocyanate "DURANATE MFA-100" (trade name, manufactured by Asahi Kasei Corporation, polyfunctional isocyanurate type, number average molecular weight of 1230)
2 TFD-100: HDI-based polyisocyanate "DURANATE TFD-100" (trade name, manufactured by Asahi Kasei Corporation, polyfunctional isocyanurate type, number average molecular weight of 1040)
3 TKA-100: HDI-based polyisocyanate "DURANATE TKA-100" (trade name, manufactured by Asahi Kasei Corporation, isocyanurate type, number average molecular weight of 670)

Example 10A 0.03 g of 2,2,4-trimethylpentane was added to 300 g of NTI to obtain an isocyanate composition. A polyisocyanate mixture was obtained in the same operation as in Example 1A except that this isocyanate composition was used in place of NTI.

The evaluation results of this polyisocyanate mixture were the same as those in Example 1A.

Example 11A 0.03 g of hexadecane was added to 300 g of NTI to obtain an isocyanate composition. A polyisocyanate mixture was obtained in the same operation as in Example 1A except that this isocyanate composition was used in place of NTI.

The evaluation results of this polyisocyanate mixture were the same as those in Example 1A.

(Synthesis Example 5A) Synthesis of C-1A

A four-necked flask equipped with a stirrer, a thermometer, a reflux cooling pipe, and a nitrogen blowing pipe was prepared such that a nitrogen atmosphere was formed therein and charged with 20 g of NTI, the mixture was heated to 60° C., 7.7 g of methanol was added thereto, and the state of the mixture was held for 4 hours while stirring, thereby obtaining N-substituted carbamic acid ester C-1.

Example 12A 0.03 g of the N-substituted carbamic acid ester C-1 was added to 300 g of NTI to obtain an isocyanate composition. A polyisocyanate mixture was obtained in the same operation as in Example 1A except that this isocyanate composition was used in place of NTI.

The evaluation results of this polyisocyanate mixture were the same as those in Example 1A.

Second Embodiment

[Measuring Method]
<Viscosity>

The viscosity was measured at 25° C. using an E type viscometer (manufactured by Tokimec. Inc.). During the measurement, a standard rotor (1°34'×R24) was used. The rotation speed was as follows.

100 rpm (in a case where the viscosity was less than 128 mPa·s)
50 rpm (in a case where the viscosity was 128 mPa·s or greater and less than 256 mPa·s)
20 rpm (in a case where the viscosity was 256 mPa·s or greater and less than 640 mPa·s)
10 rpm (in a case where the viscosity was 640 mPa·s or greater and less than 1280 mPa·s)
5 rpm (in a case where the viscosity was 1280 mPa·s or greater and less than 2560 mPa·s)

<NCO Content>

The NCO content (% by mass) was acquired by neutralizing the isocyanate group in the measurement sample with excess 2 N amine and performing back titration with 1 N hydrochloric acid.

<Number Average Molecular Weight>

The number average molecular weight of the polyisocyanate mixture was acquired by measurement according to gel permeation chromatograph (hereinafter, abbreviated as "GPC") using the following device based on the number average molecular weight in terms of polystyrene.

Device: "HLC-8120GPC" (trade name, manufactured by Tosoh Corporation)

Columns: "TSKgel Super H1000" (trade name, manufactured by Tosoh Corporation)×1

"TSKgel Super H2000" (trade name, manufactured by Tosoh Corporation)×1

"TSKgel Super H3000" (trade name, manufactured by Tosoh Corporation)×1

Carrier: tetrahydrofuran

Detection method: differential refractometer

Sample concentration: 5 wt/vol %

Outflow: 0.6 mL/min

Column temperature: 30° C.

<Average Number of Isocyanate Groups>

The average number of isocyanate groups in the polyisocyanate mixture was calculated using the following equation based on the number average molecular weight and the NCO content (% by mass of isocyanate group).

$$\text{Average number of inocyanate groups} = \frac{\left(\begin{array}{c}\text{number average}\\ \text{molecular weight}\end{array}\right) \times (\% \text{ by mass of isocyanate group})}{\text{amount of isocyanate (42)} \times 100}$$

<Molar Ratio Quantitative Method of Isocyanurate Structure, Urethane Structure, and Allophanate Structure>

The molar ratio of the isocyanurate structure, the urethane structure, and the allophanate structure of the polyisocyanate (B) was quantified by performing IR measurement.

Specific measurement conditions are as follows.

Device name: FT/IR-4200 type A (manufactured by JASCO Corporation)

Light source: halogen lamp

Cumulative number: 16 times

Resolving power: 4 cm$^{-1}$

Under the measurement conditions described above, absorption of each C=O group of the isocyanurate structure, the urethane structure, and the allophanate structure was detected at 1685 to 1720 cm$^{-1}$. Further, absorption of each N—H group of the urethane structure and the allophanate structure was detected at 3000 to 3600 cm$^{-1}$. The isocyanurate structure ratio was calculated using an expression of (height ratio of peaks at 3000 to 3600 cm$^{-1}$)/(height ratio of peaks at 1685 to 1720 cm$^{-1}$).

In addition, as the result of IR measurement of Desmodur IL BA (TDI-derived isocyanurate product, manufactured by Covestro AG), the above-described ratio was 0.01. Further, as the result of IR measurement of Desmodur L75 (TDI/trimethylolpropane urethane product, manufactured by Covestro AG), the above-described ratio was 0.32. Therefore, in a case where the ratio obtained by IR measurement was 0.28 or less, the relationship of "isocyanurate structure/(isocyanate structure+urethane structure+allophanate structure)" was determined to be 0.10 or greater.

<Method of Evaluating Drying Properties>

An acrylic polyol ("Setalux 1753", trade name, manufactured by Nuplex Resins, LLC, resin solid content concentration of 70%, hydroxyl value of 138.6 mgKOH/g) and the polyisocyanate mixture were blended with each other such that the equivalent ratio of the isocyanate group to the hydroxyl group was set to 1.0, and the solid content was adjusted to 50% by mass using butyl acetate. A glass plate was coated with the adjusted coating composition such that the film thickness was set to 40 μm and cured under a temperature condition of 23° C. at 50% RH. After a certain period of time, a cotton ball (a cylinder having a diameter of 2.5 cm and a height of 2.0 cm) was placed on the coating film, and 100 g of a weight was placed thereon for 60 seconds. Thereafter, the weight and the cotton were removed therefrom, and the cotton trace remaining on the coating film was observed. A case where the trace completely disappeared within 3 hours was evaluated as "A", a case where the trace completely disappeared within a time period of longer than 3 hours to 4 hours was evaluated as "B", a case where the trace completely disappeared within a time period of longer than 4 hours to 6 hours was evaluated as "C", and a case where the trace disappeared after 6 hours was evaluated as "D".

<Method of Evaluating Impact Resistance>

An acrylic polyol (resin solid content concentration of 55%, hydroxyl value of 30 mgKOH/resin g) and the polyisocyanate mixture were blended with each other such that the equivalent ratio between the hydroxyl group and the isocyanate group was set to 1:1, and a mild steel plate was coated with the coating composition formed by adjusting the coating viscosity to be 20 seconds with Ford cup No. 4 using butyl acetate such that the resin film thickness was set to 30 μm. The resulting plate was allowed to stand under a temperature condition of 23° C. at a humidity of 50% for 72 hours, thereby obtaining a test coating film.

An impact was applied using a Du Pont type impact tester from the surface (front surface) on which the coating film of the mild steel plate was formed using a weight (500 g, ¼ inches), and the height of the weight was measured at the time of the coating film being damaged. A case where damage to the coating film at a size of 50 cm was not observed was evaluated as "A", a case where damage to the coating film at a size of 50 cm was observed as evaluated as "B", and a case where damage to the coating film at a size of 40 cm or less was observed as evaluated as C.

<Method of Evaluating Solvent Resistance>

An acrylic polyol (resin solid content concentration of 55%, hydroxyl value of 30 mgKOH/resin g) and the polyisocyanate mixture were blended with each other such that the equivalent ratio between the hydroxyl group and the isocyanate group was set to 1:1, and a mild steel plate was coated with the coating composition formed by adjusting the coating viscosity to be 20 seconds with Ford cup No. 4 using butyl acetate such that the resin film thickness was set to 30 μm. The resulting plate was allowed to stand under a temperature condition of 23° C. at a humidity of 50% for 72 hours, thereby obtaining a test coating film.

A gasohol liquid (obtained by mixing 40% by mass of isooctane, 40% by mass of toluene, and 20% by mass of ethanol) was spotted on the obtained coating film such that the diameter thereof was set to 1 cm, the coating film was covered with cover glass, and the resultant was allowed to stand under a temperature condition of 23° C. at a humidity of 50% for 24 hours. Thereafter, the gasohol liquid was wiped off, and the appearance of the coating film was observed. As the result, a case where the appearance was not changed was evaluated as "A", a case where the contour of the liquid was slightly observed was evaluated as "B", a case where the contour of the liquid was clearly observed was evaluated as "C", and a case where deterioration was partially observed in addition to the contour of the liquid was evaluated as "D".

<Method of Evaluating Recoat Adhesiveness>

An acrylic polyol (resin solid content concentration of 55%, hydroxyl value of 30 mgKOH/resin g) and the polyisocyanate mixture were blended with each other such that the equivalent ratio between the hydroxyl group and the isocyanate group was set to 1:1, and a mild steel plate was coated with the coating composition formed by adjusting the coating viscosity to be 20 seconds with Ford cup No. 4 using butyl acetate such that the resin film thickness was set to 30 μm. After the resulting plate was allowed to stand under a temperature condition of 23° C. at a humidity of 50% for 72 hours, an acrylic polyol ("Setalux 1903", trade name, manufactured by Nuplex Resins, LLC, resin solid content concentration of 75%, hydroxyl value of 150 mgKOH/g) and the polyisocyanate mixture were blended with each other such that the equivalent ratio of the isocyanate group to the hydroxyl group was set to 1:1, and the plate was coated with the coating composition formed by adjusting the coating viscosity to be 20 seconds with Ford cup No. 4 using butyl acetate such that the resin film thickness was set to 30 μm. The resulting plate was allowed to stand under a temperature condition of 23° C. at a humidity of 50% for 72 hours. The adhesiveness test for this coating film was performed in conformity with JIS K5600-5-6. A case where a peeled coating film was not found was evaluated as "A", a case where floating was partly found in a cut portion was evaluated as "B", a case where less than the half of the peeled coating film was found was evaluated as "C", and a case where more than the half of the peeled coating film was found was evaluated as "D".

<Method of Evaluating Sagging Resistance>

An acrylic polyol (resin solid content concentration of 55%, hydroxyl value of 30 mgKOH/resin g) and the polyisocyanate mixture were blended with each other such that the equivalent ratio between the hydroxyl group and the isocyanate group was set to 1:1, and a mild steel plate was coated with the coating composition formed by adjusting the coating viscosity to be 20 seconds with Ford cup No. 4 using butyl acetate. The sagging resistance was evaluated using this coating solution and a sag tester standard (manufactured by TQC).

In the evaluation carried out at a temperature of 10° C. or lower, a case where sagging was not observed at all was evaluated as "A", a case where sagging was slightly observed was evaluated as "B", a case where sagging was transferred to a line with a partially different film thickness was evaluated as "C", and a case where a line with a different film thickness was unclear was evaluated as "D".

(Synthesis Example 1B) Synthesis of T-1 (NTI)

1060 g of 4-aminomethyl-1,8-octamethylenediamine (hereinafter, referred to as triamine) was dissolved in 1500 g of methanol in a four-necked flask equipped with a stirrer, a thermometer, and a gas introduction pipe, and 1800 ml of 35 mass % hydrochloric acid was gradually added dropwise thereto while cooling. The methanol and water were removed and concentrated under reduced pressure, and the resultant was dried at 60° C./5 mmHg for 24 hours, thereby obtaining triamine hydrochloride as a white solid. 650 g of the obtained triamine hydrochloride was formed into fine powder and was suspended in 5000 g of o-dichlorobenzene, the reaction solution was heated while stirring, phosgene was started to be blown into the reaction solution at a rate of 200 g/hr at the time of the temperature reaching 100° C., the temperature was continuously increased and held at 180° C., and phosgene was continuously blown into the reaction solution for 12 hours. The dissolved phosgene and the solvent were distilled off under reduced pressure, and vacuum distillation was carried out, thereby obtaining 420 g of 4-isocyanate methyl-1,8-octamethylene diisocyanate (hereinafter, referred to as "NTI") which was colorless and transparent and had a boiling point of 16° C. to 163° C./1.2 mmHg. The NCO content was 50.0% by weight.

(Synthesis Example 2B) Synthesis of T-2 (LTI)

122.2 g of ethanolamine, 100 ml of o-dichlorobenzene, and 420 ml of toluene were put into a four-necked flask equipped with a stirrer, a thermometer, and a gas introduction pipe, ice-cooled hydrogen chloride gas was introduced into the flask, and the ethanolamine was converted to hydrochloride. Next, 182.5 g of lysine hydrochloride was added thereto, the reaction solution was heated to 80° C., the ethanolamine hydrochloride was dissolved therein, and hydrogen chloride gas was introduced thereinto to obtain lysine dihydrochloride. Further, the hydrogen chloride gas was allowed pass therethrough at 20 to 30 ml/min, the reaction solution was heated to 116° C., and the temperature was maintained until water was not distilled off any longer. The generated reaction mixture was recrystallized in the mixed solution of methanol and ethanol to obtain 165 g of lysine β-aminoethylester trihydrochloride. 100 g of this lysine β-aminoethylester trihydrochloride was formed into fine powder and was suspended in 1200 ml of o-dichlorobenzene, the reaction solution was heated while stirring, phosgene was started to be blown into the reaction solution at a rate of 0.4 mol/hr at the time of the temperature reaching 120° C., and the temperature was held for 10 hours and then increased to 150° C. The suspension was almost dissolved. The resulting solution was cooled and filtered, the dissolved phosgene and the solvent were distilled off under reduced pressure, and vacuum distillation was carried out, thereby obtaining 80.4 g of LTI which was colorless and transparent and had a boiling point of 155° C. to 157° C./0.022 mmHg. The NCO content was 47.1% by weight.

(Synthesis Example 3B) Synthesis of T-3 (GTI)

275 g of glutamic acid hydrochloride, 800 g of ethanolamine hydrochloride, and 150 ml of toluene were put into a four-necked flask equipped with a stirrer, a thermometer, and a gas introduction pipe, and the solution was heated and refluxed at 110° C. for 24 hours until azeotropy of water did not occur any longer while hydrogen chloride gas was blown into the flask. The generated reaction mixture was recrystallized in the mixed solution of methanol and ethanol to obtain 270 g of bis(2-aminoethyl)glutamate trihydrochloride. 85 g of this bis(2-aminoethyl)glutamate trihydrochloride was suspended in 680 g of o-dichlorobenzene, the reaction solution was heated while stirring, phosgene was started to be blown into the reaction solution at a rate of 0.8 mol/hr at the time of the temperature reaching 135° C., the temperature was held for 13 hours, the reaction product was filtered, concentrated under reduced pressure, and purified using a thin film evaporator, thereby obtaining 54 g of GTI. The NCO content was 39.8% by weight.

(Synthesis Example 4B) Synthesis of P-3B
(XDI-Derived Isocyanurate Product)

A four-necked flask equipped with a stirrer, a thermometer, a reflux cooling pipe, and a nitrogen blowing pipe was prepared such that the inside thereof was replaced with nitrogen and charged with 1000 g of XDI and 0.5 g of 1,3-butanediol, and the mixture was stirred at 75° C. for 2 hours, and a urethane-forming reaction was carried out. Thereafter, the mixture was cooled to 60° C., and 0.08 g of a 37% solution of tetrabutylammonium hydroxide in methanol serving as a catalyst was added thereto. Further, 0.40 g of a 37% solution of tetrabutylammonium hydroxide in methanol was added and continuously added thereto. After four hours, 0.5 g of phosphoric acid was added thereto and the reaction was stopped.

Next, the reaction solution was filtered, and the unreacted XDI monomer was removed by thin film distillation. The content of the isocyanate group of the obtained polyisocyanate was 20.6% by mass, and the average number of isocyanate groups was 3.3.

Example 1B

T-2 and the following P-2B were mixed at room temperature for 1 hours while stirring at a mass ratio of 50:50 of resin components, thereby obtaining a polyisocyanate mixture. Thereafter, a coating composition was formed, and the drying properties, the impact resistance, the solvent resistance, the recoat adhesiveness, and the sagging resistance of the coating composition after being applied and dried were evaluated. The obtained results are listed in Table 2.

Examples 2B to 6B and Comparative Examples 1B to 3B

The process was carried out in the same manner as in Example 1B except that the triisocyanate (A) and the polyisocyanate (B) listed in Table 2 or Table 3 were mixed at the ratio listed in Table 2 or Table 3. Thereafter, a coating composition was formed, and the drying properties, the impact resistance, the solvent resistance, the recoat adhesiveness, and the sagging resistance of the coating composition after being applied and dried were evaluated.

The obtained results are listed in Table 2 or Table 3.

TABLE 3

| | | Comparative Example 1B | Comparative Example 2B | Comparative Example 3B |
|---|---|---|---|---|
| Triisocyanate [A] | T-1 | 100 | | 25 |
| | T-2 | | | |
| | T-3 | | | |
| Resin ratio of diisocyanate or polyisocyanate [B] | P-1B(L75) | | | 75 |
| | P-2B(ILBA) | | 100 | |
| | P-3B | | | |
| | TDI monomer (T100) | | | |
| | Ratio of isocyanurate product | — | 0.1 or greater | Less than 0.1 |
| Polyisocyanate mixture | Average number of isocyanate groups | 3.0 | 3.2 | 3.2 |
| Drying properties | | C | A | A |
| Impact resistance | | A | C | B |
| Solvent resistance | | A | A | B |
| Recoat adhesiveness | | A | D | D |
| Sagging resistance | | C | A | A |

In Tables 2 and 3, "L75", "ILBA", and "T100" indicate the following materials.

L75 (P-1B): TDI/trimethylolpropane urethane product "Desmodur L75" (trade name, manufactured by Covestro AG, solid content of 75%, solvent: ethyl acetate)

ILBA (P-2B): isocyanurate product of TDI "Desmodur ILBA" (trade name, manufactured by Covestro AG, solid content of 51%, solvent: butyl acetate)

T100: TDI monomer "Desmodur T100" (trade name, manufactured by Covestro AG, solid content of 100%)

Example 7B 0.03 g of 2,2,4-trimethylpentane was added to 300 g of LTI to obtain an isocyanate composition. A polyisocyanate mixture was obtained in the same operation as in Example 1B except that this isocyanate composition was used in place of T-2.

The evaluation results of this polyisocyanate mixture were the same as those in Example 1B.

Example 8B 0.03 g of hexadecane was added to 300 g of LTI to obtain an isocyanate composition. A polyisocyanate mixture was

TABLE 2

| | | Example 1B | Example 2B | Example 3B | Example 4B | Example 5B | Example 6B |
|---|---|---|---|---|---|---|---|
| Triisocyanate [A] | T-1 | | | 25 | | | |
| | T-2 | 50 | 25 | | | 25 | 25 |
| | T-3 | | | | 25 | | |
| Resin ratio of diisocyanate or polyisocyanate [B] | P-1B(L75) | | | | | | |
| | P-2B(ILBA) | 50 | 75 | 75 | 75 | | 50 |
| | P-3B | | | | | 75 | |
| | TDI monomer (T100) | | | | | | 25 |
| | Ratio of isocyanurate structure | 0.1 or greater | 0.1 or greater | 0.1 or greater | 0.1 or greater | 0.1 or greater | 0.1 or greater |
| Polyisocyanate mixture | Average number of isocyanate groups | 3.1 | 3.2 | 3.2 | 3.2 | 3.2 | 2.9 |
| Drying properties | | A | A | B | A | A | B |
| Impact resistance | | A | B | B | B | B | A |
| Solvent resistance | | A | A | A | A | A | B |
| Recoat adhesiveness | | A | A | A | B | A | A |
| Sagging resistance | | A | A | A | A | A | A | obtained in the same operation as in Example 1B except that this isocyanate composition was used in place of T-2.

The evaluation results of this polyisocyanate mixture were the same as those in Example 1B.

Synthesis Example 5B

A four-necked flask equipped with a stirrer, a thermometer, a reflux cooling pipe, and a nitrogen blowing pipe was prepared such that a nitrogen atmosphere was formed therein and charged with 20 g of LTI, the mixture was heated to 60° C., 7.7 g of methanol was added thereto, and the state of the mixture was held for 4 hours while stirring, thereby obtaining N-substituted carbamic acid ester C-1.

Example 9B 0.03 g of the N-substituted carbamic acid ester C-1 was added to 300 g of LTI to obtain an isocyanate composition. A polyisocyanate mixture was obtained in the same operation as in Example 1B except that this isocyanate composition was used in place of T-2.

The evaluation results of this polyisocyanate mixture were the same as those in Example 1B.

As described above, it was confirmed that each polyisocyanate mixture of each example to which the present invention had been applied had excellent drying properties, impact resistance, solvent resistance, recoat adhesiveness, and sagging resistance.

Third Embodiment

[Measuring Method]
<Viscosity>
The viscosity was measured in the same manner as in "<viscosity>" in the second embodiment.
<NCO Content>
The NCO content was measured in the same manner as in "<NCO content>" in the second embodiment.
<Number Average Molecular Weight>
The number average molecular weight was measured in the same manner as in "<number average molecular weight>" in the second embodiment.
<Molar Ratio Quantitative Method of Isocyanurate Structure, Urethane Structure, and Allophanate Structure>
The molar ratio of the isocyanurate structure, the urethane structure, and the allophanate structure was quantified by performing $^{13}$C-NMR measurement using Biospin Avance 600 (trade name, manufactured by Bruker Biospin Corp.). An NTI material was shown in regard to the peak position of each structure. However, the peak position was changed due to triisocyanate, the peak position was appropriately corrected using a standard substance or the like.

Specific measurement conditions are as follows.
$^{13}$C-NMR device: AVANCE 600 (manufactured by Bruker Biospin Corp.)
CRYOPROBE (manufactured by Bruker Biospin Corp.)
Cryo Probe
CPDUL
600S3-C/H-D-05Z
Resonance frequency: 150 MHz
Concentration: 60 wt/vol %
Shift reference: $CDCl_3$ (77 ppm)
Cumulative number: 10000 times
Pulse program: zgpg 30 (proton complete decoupling method, waiting time of 2 sec)

Each integral value of a signal described below was divided by the number of carbons being measured, and each molar ratio was acquired from the value.
Isocyanurate structure: approximately 148.5 ppm: integral value÷3 Urethane structure: approximately 156.3 ppm: (integral value÷1−integral value of allophanate structure)
Allophanate structure: approximately 154 ppm: integral value÷1
<Method of Evaluating Drying Properties>
The drying properties were evaluated in the same manner as in "<method of evaluating drying properties>" in the second embodiment.
<Method of Evaluating Solvent Resistance>
The solvent resistance was evaluated in the same manner as in "<method of evaluating solvent resistance>" in the second embodiment.
<Method of Evaluating Recoat Adhesiveness>
The recoat adhesiveness was evaluated in the same manner as in "<method of evaluating recoat adhesiveness>" in the second embodiment.
<Method of Evaluating Weather Resistance>
An acrylic polyol (resin solid content concentration of 55%, hydroxyl value of 30 mgKOH/resin g) and the polyisocyanate mixture were blended with each other such that the equivalent ratio between the hydroxyl group and the isocyanate group was set to 1:1, and a mild steel plate was coated with the coating composition formed by adjusting the coating viscosity to be 20 seconds with Ford cup No. 4 using butyl acetate such that the resin film thickness was set to 30 μm. After the resulting plate was allowed to stand under a temperature condition of 23° C. at a humidity of 50% for 72 hours to obtain a test coating film.

The obtained coating film was evaluated using a super xenon weather meter (manufactured by Suga Test Instruments Co., Ltd.). The test conditions are described below.
Irradiance: 180 W/m$^2$
Operating cycle: at time of drying/at time of spaying=cycle operation of 102/18 minutes
At time of drying: black panel at temperature of 63° C. and at humidity of 50%
At time of spraying: temperature in layer: 28° C.
A case where the gloss retention after 500 hours was 85% or greater was evaluated as "A", a case where the gloss retention after 500 hours was 80% or greater and less than 85% was evaluated as "B", a case where the gloss retention after 500 hours was 70% or greater and less than 80% was evaluated as "C", and a case where the gloss retention after 500 hours was less than 70% was evaluated as "D".
<Method of Evaluating Sagging Resistance>
The sagging resistance was evaluated in the same manner as in "<method of evaluating sagging resistance>" in the second embodiment.
<Method of Evaluating Quick Drying Properties>
A solventless acrylic polyol ("ARUFON UH-2041", trade name, manufactured by Toagosei Co., Ltd., resin solid content concentration of 97%, hydroxyl value of 120 mgKOH/g) and a polyisocyanate composition were blended with each other such that the equivalent ratio between the hydroxyl group and the isocyanate group was set to 1.0, the mixture was mixed using a vacuum defoaming machine at room temperature for 1 hour under reduced pressure, and the resultant was allowed to stand for 1 hour under reduced pressure.

A glass plate was roller-coated with the adjusted coating composition such that the film thickness was set to 60 μm and cured under a temperature condition of 23° C. at 50% RH. After a certain period of time, a cotton ball (a cylinder having a diameter of 2.5 cm and a height of 2.0 cm) was placed on the coating film, and 100 g of a weight was placed thereon for 60 seconds. Thereafter, the weight and the cotton were removed therefrom, and the cotton trace remaining on the coating film was observed. A case where the trace completely disappeared within 5 hours was evaluated as "A", a case where the trace completely disappeared within a time period of longer than 5 hours to 7 hours was evaluated as "B", a case where the trace completely disappeared within a time period of longer than 7 hours to 10 hours was evaluated as "C", and a case where the trace disappeared after 10 hours was evaluated as "D".

<Method of Evaluating Chemical Resistance>

A solventless acrylic polyol ("ARUFON UH-2041", trade name, manufactured by Toagosei Co., Ltd., resin solid content concentration of 97%, hydroxyl value of 120 mgKOH/g) and a polyisocyanate composition were blended with each other such that the equivalent ratio between the hydroxyl group and the isocyanate group was set to 1.0, the mixture was mixed using a vacuum defoaming machine at room temperature for 1 hour under reduced pressure, and the resultant was allowed to stand for 1 hour under reduced pressure.

A glass plate was roller-coated with the adjusted coating composition such that the film thickness was set to 60 μm and allowed to stand under a temperature condition of 23° C. at 50% RH for 7 days. Thereafter, a 5% sodium hydroxide aqueous solution was spotted on the obtained coating film such that the diameter thereof was set to 1 cm, the coating film was covered with cover glass, and the resultant was allowed to stand under a temperature condition of 23° C. at a humidity of 50% for 24 hours. Thereafter, the 5% sodium hydroxide aqueous solution was wiped off, and the appearance of the coating film was observed. As the result, a case where the appearance was not changed was evaluated as "A", a case where the contour of the liquid was slightly observed was evaluated as "B", a case where the contour of the liquid was clearly observed was evaluated as "C", and a case where deterioration was partially observed in addition to the contour of the liquid was evaluated as "D".

<Method of Evaluating Heel Mark Resistance Test>

A solventless acrylic polyol ("ARUFON UH-2041", trade name, manufactured by Toagosei Co., Ltd., resin solid content concentration of 97%, hydroxyl value of 120 mgKOH/g) and a polyisocyanate composition were blended with each other such that the equivalent ratio between the hydroxyl group and the isocyanate group was set to 1.0, the mixture was mixed using a vacuum defoaming machine at room temperature for 1 hour under reduced pressure, and the resultant was allowed to stand for 1 hour under reduced pressure.

A P tile was roller-coated with the adjusted coating composition such that the film thickness was set to 100 μm and allowed to stand under a temperature condition of 23° C. at 50% RH for 7 days. A test was performed on the obtained coating film according to a "floor polish test method" in conformity with JIS K 3920. A case where the coating film after the test was not almost stained was evaluated as "A", a case where the coating film after the test was slightly stained was evaluated as "B", and a case where the coating film after the test was clearly stained was evaluated as "C".

(Synthesis Example 1C) Synthesis of T-1 (NTI)

420 g of 4-isocyanate methyl-1,8-octamethylene diisocyanate (hereinafter, referred to as "NTI") which was colorless and transparent and had a boiling point of 161° C. to 163° C./1.2 mmHg was obtained in the same manner as in Synthesis Example 1B. The NCO content thereof was 50.0% by weight.

(Synthesis Example 2C) Synthesis of T-2 (LTI)

80.4 g of LTI which was colorless and transparent and had a boiling point of 155° C. to 157° C./0.022 mmHg was obtained in the same manner as in Synthesis Example 2B. The NCO content thereof was 47.1% by weight.

(Synthesis Example 3C) Synthesis of T-3 (GTI)

54 g of GTI was obtained in the same manner as in Synthesis Example 3B. The NCO content thereof was 39.8% by weight.

(Synthesis Example 4C) Synthesis of T-4 (HDI-Based Polyisocyanurate Product)

A four-necked flask equipped with a stirrer, a thermometer, a reflux cooling pipe, and a nitrogen blowing pipe was prepared such that the inside thereof was replaced with nitrogen and charged with 1000 g of HDI, the mixture was stirred at 60° C., and 0.1 g of tetramethylammonium caprylate was added to the mixture as a catalyst. After four hours, 0.2 g of phosphoric acid was added at the time of the refractive index of the reaction solution reaching 1.4680 (conversion rate of 38%), and the reaction was stopped.

Next, the reaction solution was filtered, and the unreacted HDI monomer was removed by thin film distillation.

The viscosity of the obtained polyisocyanate at 25° C. was 2700 mPa·, the content of the isocyanate group was 22.2% by mass, the number average molecular weight was 650, and the average number of isocyanate groups was 3.4. Thereafter, the presence of an isocyanurate bond was confirmed by NMR measurement.

Example 1C

T-2 and P-1C (VESTANAT T1890-70E, manufactured by Evonik Industries AG, isocyanurate product of IPDI, solid content of 70%, solvent: butyl acetate) were mixed at room temperature for 1 hour while stirring such that the mass ratio of resin components was set to 5:5. Thereafter, a coating composition was prepared, and the drying properties, the recoat adhesiveness, the solvent resistance, the weather resistance, and the sagging resistance of the coating composition after being applied and dried were evaluated. The obtained results are listed in Table 4.

Examples 2C to 4C and Comparative Examples 1C to 5C

The process was carried out in the same manner as in Example 1C except that the triisocyanate (A) and the polyisocyanate (B) listed in Table 4 or Table 5 were mixed at the ratio listed in the tables. Thereafter, a coating composition was prepared, and the drying properties, the recoat adhesiveness, the solvent resistance, the weather resistance, and the sagging resistance of the coating composition after being applied and dried were evaluated. The obtained results are listed in Tables 4 and 5. In Tables 4 and 5, (T1890-70E) indicates an isocyanurate product of IPDI (VESTANAT T1890-70E, manufactured by Evonik Industries AG, solid content of 70%, solvent: butyl acetate), and (NY215A) indicates an IPDI/trimethylolpropane urethane product (MITECH NY215A, manufactured by Mitsui Chemicals Polyurethanes Inc., solid content of 75%, solvent: ethyl acetate).

TABLE 4

|  |  | Example 1C | Example 2C | Example 3C | Example 4C |
|---|---|---|---|---|---|
| Triisocyanate (A) | T-1 |  |  | 25 |  |
|  | T-2 | 50 | 25 |  |  |
|  | T-3 |  |  |  | 25 |
| HDI-based polyisocyanate | T-4 |  |  |  |  |
| Resin ratio of polyisocyanate (B) | P-1C (T1890-70E) | 50 | 75 | 75 | 75 |
|  | P-2C(NY215A) |  |  |  |  |
|  | Ratio of isocyanurate structure | 0.98 | 0.98 | 0.98 | 0.98 |
| Drying properties |  | A | A | B | A |
| Recoat adhesiveness |  | A | A | A | A |
| Solvent resistance |  | A | B | B | B |
| Weather resistance (gloss retention) |  | A | A | A | A |
| Sagging resistance |  | A | A | A | A |

Example 5C 0.03 g of 2,2,4-trimethylpentane was added to 300 g of LTI to obtain an isocyanate composition. A polyisocyanate mixture was obtained in the same operation as in Example 1C except that this isocyanate composition was used in place of T-2.

The evaluation results of this polyisocyanate mixture were the same as those in Example 1C.

Example 6C 0.03 g of hexadecane was added to 300 g of LTI to obtain an isocyanate composition. A polyisocyanate mixture was obtained in the same operation as in Example 1C except that this isocyanate composition was used in place of T-2.

The evaluation results of this polyisocyanate mixture were the same as those in Example 1C.

Synthesis Example 5C

A four-necked flask equipped with a stirrer, a thermometer, a reflux cooling pipe, and a nitrogen blowing pipe was prepared such that a nitrogen atmosphere was formed therein and charged with 20 g of LTI, the mixture was heated to 60° C., 7.2 g of methanol was added thereto, and the state of the mixture was held for 4 hours while stirring, thereby obtaining N-substituted carbamic acid ester C-1.

Example 7C 0.03 g of the N-substituted carbamic acid ester C-1 was added to 300 g of LTI to obtain an isocyanate composition. A polyisocyanate mixture was obtained in the same operation as in Example 1C except that this isocyanate composition was used in place of T-2.

The evaluation results of this polyisocyanate mixture were the same as those in Example 1C.

Example 8C

Example 9C and Comparative Examples 6C to 7C

The process was carried out in the same manner as in Example 6 except that the triisocyanate (A) and the polyisocyanate (B) listed in Table 6 were mixed at the ratio listed in the table. Next, after a solventless acrylic polyol and the polyisocyanate composition were mixed using a vacuum defoaming machine, the mixture was dried, and the quick drying properties, the chemical resistance, and the heel mark resistance were evaluated. The obtained results are listed in Table 6. In Table 6, (N3400) indicates a uretdione product of HDI ("Desmodur N3400", trade name, manufactured by Covestro AG, solid content of 100%), and (T1890/100) indicates an isocyanurate product of IPDI (VESTANAT T1890/100, manufactured by Evonik Industries AG, solid content of 100%)

TABLE 5

|  |  | Comparative Example 1C | Comparative Example 2C | Comparative Example 3C | Comparative Example 4C | Comparative Example 5C |
|---|---|---|---|---|---|---|
| Triisocyanate (A) | T-1 | 100 |  |  | 25 |  |
|  | T-2 |  |  |  |  | 25 |
|  | T-3 |  |  |  |  |  |
| HDI-based polyisocyanate | T-4 |  |  | 25 |  |  |
| Resin ratio of polyisocyanate (B) | P-1C(T1890-70E) |  |  |  |  |  |
|  | P-2C(NY215A) |  | 100 | 75 | 75 | 75 |
|  | Ratio of isocyanurate structure | — | Less than 0.02 | Less than 0.02 | Less than 0.02 | Less than 0.02 |
| Drying properties |  | C | B | C | B | A |
| Recoat adhesiveness |  | B | C | C | C | B |
| Solvent resistance |  | B | C | A | B | B |
| Weather resistance (gloss retention) |  | B | B | A | B | B |
| Sagging resistance |  | C | A | B | A | A |

TABLE 6

|  |  | Example 8C | Example 9C | Comparative Example 6C | Comparative Example 7C |
|---|---|---|---|---|---|
| Triisocyanate (A) | T-1 | 50 |  |  |  |
|  | T-2 |  | 50 |  |  |
|  | T-3 |  |  |  |  |
| HDI-based polyisocyanate | T-4 |  |  | 100 |  |
|  | T-5(N3400) |  |  |  | 25 |

TABLE 6-continued

| | | Example 8C | Example 9C | Comparative Example 6C | Comparative Example 7C |
|---|---|---|---|---|---|
| Resin ratio of polyisocyanate (B) | P-3C (T1890/100) | 50 | 50 | | 75 |
| | Ratio of isocyanurate structure | 0.98 | 0.98 | — | 0.98 |
| Quick drying properties | | B | A | C | B |
| Chemical resistance | | A | A | B | C |
| Heel mark resistance | | A | A | B | A |

As described above, it was confirmed that each polyisocyanate mixture of each example had excellent drying properties, recoat adhesiveness, solvent resistance, weather resistance, and sagging resistance.

Fourth Embodiment

[Measuring Method]
<Viscosity>
The viscosity was measured in the same manner as in "<viscosity>" in the second embodiment.

Further, the nonvolatile content of each polyisocyanate mixture prepared in each example and each comparative example described below was investigated according to the method described below, and the measurement was carried out as it was in a case where the value of the content was 98% by mass or greater.

<Nonvolatile Content>
The nonvolatile content was acquired from the residual amount in a case where the polyisocyanate mixture was heated at 105° C. for 3 hours.
Nonvolatile content (% by mass)=(mass of polyisocyanate mixture after being heated at 105° C. for 3 hours)/(mass of polyisocyanate mixture before being heated)×100

<Number Average Molecular Weight>
The number average molecular weight was measured in the same manner as in "<number average molecular weight>" in the second embodiment.

<NCO Content>
The NCO content (% by mass) was acquired by neutralizing the isocyanate group in the measurement sample with excess 2 N amine and performing back titration with 1 N hydrochloric acid. Further, the nonvolatile content of each polyisocyanate mixture prepared in each example and each comparative example described below was investigated according to the method described above, and the measurement was carried out as it was in a case where the value of the content was 98% by mass or greater.

<Molar Ratio Quantitative Method of Iminooxadiazine Dione Structure, Uretdione Structure, Isocyanurate Structure, Allophanate Structure, Urethane Structure, and Biuret Structure>
The molar ratio of the imninooxadiazine dione structure, the uretdione structure, the isocyanurate structure, the allophanate structure, the urethane structure, and the biuret structure was acquired by performing $^{13}$C-NMR measurement using Biospin Avance 600 (trade name, manufactured by Bruker Biospin Corp.).

Specific measurement conditions are as follows.
$^{13}$C-NMR device: AVANCE 600 (manufactured by Bruker Biospin Corp.)
CRYOPROBE (manufactured by Bruker Biospin Corp.) Cryo Probe
CPDUL
600S3-C/H-D-05Z
Resonance frequency: 150 MHz
Concentration: 60 wt/vol %
Shift reference: CDCl$_3$ (77 ppm)
Cumulative number: 10000 times
Pulse program: zgpg 30 (proton complete decoupling method, waiting time of 2 sec)

Each integral value of a signal described below was divided by the number of carbons being measured, and each molar ratio was acquired from the value.
Uretdione structure: approximately 157.5 ppm: integral value÷2
Iminooxadiazine dione structure: approximately 137.3 ppm: integral value÷1
Isocyanurate structure: approximately 148.6 ppm: integral value÷3
Uretdione structure: approximately 157.5 ppm: integral value÷2
Allophanate structure: approximately 154 ppm: integral value÷1
Urethane structure: approximately 156.3 ppm: (integral value÷1−integral value of allophanate structure)
Biuret structure: approximately 155.8 ppm: integral value÷2

<Decrease in Viscosity>
Based on the results obtained by measuring the viscosity of the polyisocyanate mixture, a case where the viscosity at 25° C. was less than 100 mPa·s was evaluated as A, a case where the viscosity at 25° C. was 100 mPa·s or greater and less than 300 mPa·s was evaluated as B, and a case where the viscosity at 25° C. was 300 mPa·s or greater was evaluated as C.

<Method of Evaluating Drying Properties>
An acrylic polyol ("Setalux 1753", trade name, manufactured by Nuplex Resins, LLC, resin solid content concentration of 70%, hydroxyl value of 138.6 mgKOH/g) and the polyisocyanate mixture were blended with each other such that the equivalent ratio between the isocyanate group and the hydroxyl group was set to 1.0, and the solid content was adjusted to 50% by mass using butyl acetate. A glass plate was coated with the adjusted coating composition such that the film thickness was set to 40 μm and cured under a temperature condition of 23° C. at 50% RH. After a certain period of time, a cotton ball (a cylinder having a diameter of 2.5 cm and a height of 2.0 cm) was placed on the coating film, and 100 g of a weight was placed thereon for 60 seconds. Thereafter, the weight and the cotton were removed therefrom, and the cotton trace remaining on the coating film was observed. A case where the trace completely disappeared within 8 hours was evaluated as "A", a case where the trace completely disappeared within a time period of longer than 8 hours to 10 hours was evaluated as "B", and a case where the trace disappeared after 10 hours was evaluated as "C".

<Method of Evaluating Ground Opacifying Properties>
A curable composition having the same composition as that of each example and each comparative example was applied using an applicator such that the resin film thickness was set to 40 μm except that "ACRYDIC (registered trademark) A-801-P" (trade name, manufactured by DIC Corporation, acrylic polyol, solid content concentration of 50% by mass, hydroxyl value of 50.0 mgKOH/resin g) and the polyisocyanate mixture were blended with each other such that the equivalent ratio between the isocyanate group and the hydroxyl group was set to 1.0, the solid content was adjusted to 50% by mass using butyl acetate, and a cationic electrodeposition coating plate (black, manufactured by Standard Test piece, Inc.) was coated with the curable composition such that the resin solid content was adjusted to 50% by increasing or decreasing the amount of the solvent. After the plate was coated with the curable composition, the plate was allowed to stand at room temperature for 30 minutes and then allowed to stand in an oven at 120° C. for 30 minutes. Thereafter, the plate was cooled and the coating film was confirmed to be cooled to 23° C., and the arithmetic average roughness Ra value was measured using the following device under the following conditions. As the Ra value decreases, this indicates that the ground opacifying properties are excellent.

Measuring device: scanning white interference microscope ("NewView 600s", trade name, manufactured by Zygo Corp.)

Magnification: 2.5 times

Measuring method: Ra value was measured (arithmetic deviation from center line)

A case where the Ra value was 0.025 μm or less was evaluated as "A" since the ground opacifying properties were determined to be excellent, a case where the Ra value was greater than 0.025 μm and 0.04 μm or less was evaluated as "B" since the ground opacifying properties were determined to be almost excellent, and a case where the Ra value was greater than 0.04 μm was evaluated as "C" since the ground opacifying properties was determined to be poor.

<Method of Evaluating Adhesiveness to Ground Coating Film>

After a mild steel plate was coated with an acrylic polyol (resin solid content concentration of 55%, hydroxyl value of 30 mgKOH/resin g) such that the resin film thickness was set to 40 μm, and the plate was allowed to stand at room temperature for 30 minutes, an acrylic polyol ("Setalux 1903", trade name, manufactured by Nuplex Resins, LLC, resin solid content concentration of 75%, hydroxyl value of 150 mgKOH/g) and the polyisocyanate mixture were blended with each other such that the equivalent ratio between the isocyanate group and the hydroxyl group was set to 1:1, and the plate was coated with the coating composition formed by adjusting the coating viscosity to be 20 seconds with Ford cup No. 4 using butyl acetate such that the resin film thickness was set to 30 μm. Next, the plate was allowed to stand at room temperature for 15 minutes and then cured in an oven at 120° C. for 30 minutes. The adhesiveness test was performed on this coating film in conformity with JIS K5600-5-6. A case where a peeled coating film was not found was evaluated as "A", a case where floating was partly found in a cut portion was evaluated as "B", a case where less than the half of the peeled coating film was found was evaluated as "C", and a case where more than the half of the peeled coating film was found was evaluated as "D".

(Synthesis Example 1D) Synthesis of T-1 (NTI)

420 g of 4-isocyanate methyl-1,8-octamethylene diisocyanate (hereinafter, referred to as "NTI") which was colorless and transparent and had a boiling point of 161° C. to 163° C./1.2 mmHg was obtained in the same manner as in Synthesis Example 1B. The NCO content thereof was 50.0% by weight.

(Synthesis Example 2D) Synthesis of T-2 (LTI)

80.4 g of LTI which was colorless and transparent and had a boiling point of 155° C. to 157° C./0.022 mmHg was obtained in the same manner as in Synthesis Example 2B. The NCO content thereof was 47.1% by weight.

(Synthesis Example 3D) Synthesis of T-3 (GTI)

54 g of GTI was obtained in the same manner as in Synthesis Example 3B. The NCO content thereof was 39.8% by weight.

(Synthesis Example 4D) Synthesis of P-1D

A four-necked flask equipped with a stirrer, a thermometer, a reflux cooling pipe, a nitrogen blowing pipe, and a dropping funnel was prepared such that a nitrogen atmosphere was formed therein and charged with 600 g of HDI and 0.6 g of isobutyl, the temperature of the reactor was set to 80° while the mixture was stirred, and the state thereof was held for 2 hours. Thereafter, trimethyl-2-methyl-2-hydroxyethylammonium hydroxide serving as an isocyanurate-forming catalyst was added thereto to cause an isocyanurate-forming reaction, phosphoric acid was added thereto at the time of the NCO content reaching 44.7%, and then the reaction was stopped. The reaction solution was heated to 160° C. and the state thereof was held for 1 hour. The reaction solution was cooled, filtered, and fed to a thin film evaporator, and unreacted HDI was removed, thereby obtaining polyisocyanate P-1. The viscosity of the obtained polyisocyanate P-1D at 25° C. was 620 mPa·s, and the ratio between the uretdione structure and the iminooxadiazine dione structure was 0.22, and the content of the uretdione dimer was 12% by mass.

(Synthesis Example 5D) Synthesis of P-2D

The synthesis was carried out according to the following method using a device described in the document of the related art (Japanese Patent No. 4152026). A raw material liquid formed of 1000 parts by weight of hexamethylene diisocyanate and 500 parts by weight of an equal-weight mixed solvent containing methyl cellosolve acetate and trimethyl phosphate as a reaction solvent was continuously supplied to a first reactor 4 at a rate of 1000 parts by weight of the liquid per hour.

Further, water was continuously supplied to the first reactor at a rate of 10.7 parts by weight of water per hour. The temperatures of the first reactor 4, a second reactor 7, and third reactors 9, 10, and 11 were respectively adjusted to 120° C., 150° C., and 160° C.

The reaction solution (amount of dissolved gas: 0.25 nml/ml) obtained in the above-described manner was fed to an upper gas phase portion of a deaerator set to have the same vacuum degree (5 mmHg) as that of a scraping type evaporator, and the reaction solution obtained from a lower liquid phase portion was fed to a thin film evaporator, and unreacted HDI was removed, thereby obtaining polyisocyanate P-2D.

The viscosity of the obtained polyisocyanate P-2D at 25° C. was 1700 mPa·s, and the ratio between the uretdione structure and the iminooxadiazine dione structure was 0.14, and the content of the uretdione dimer was 8% by mass.

(Synthesis Example 6D) Synthesis of P-3D

A four-necked flask equipped with a stirrer, a thermometer, a reflux cooling pipe, a nitrogen blowing pipe, and a dropping funnel was prepared such that a nitrogen atmosphere was formed therein and charged with 600 g of HDI and 21 g of 1,3-butanediol, the temperature of the mixture was increased, and the temperature of the reactor was set to 160° while the mixture was stirred, and the state thereof was held for 1 hour. The reaction solution was cooled and fed to a thin film evaporator, and unreacted HDI was removed, thereby obtaining polyisocyanate P-3. The viscosity of the obtained polyisocyanate P-3D at 25° C. was 650 mPa·s, and the ratio between the uretdione structure and the iminooxadiazine dione structure was 0.28, and the content of the uretdione dimer was 16% by mass.

Example 1D

T-2 (LTI) and P-1D were mixed at room temperature for 1 hour while stirring such that the mass ratio of resin components was set to 5:5. The viscosity of the obtained polyisocyanate mixture at 25° C. was 90 mPa·s, and the content of the uretdione dimer was 6.0% by mass. Thereafter, a coating composition was formed, and the drying properties, the ground opacifying properties, and the ground adhesiveness of the coating composition after being applied and dried were evaluated. The obtained results are listed in Table 7.

Examples 2D to 8D and Comparative Examples 1D to 6D

The process was carried out in the same manner as in Example 1 except that the triisocyanate (A) and the polyisocyanate (B) listed in Table 7 or Table 8 were mixed at the ratio listed in the tables. The viscosity of the obtained polyisocyanate mixture and % by mass of the uretdione dimer are listed in Table 7 to Table 8. Thereafter, a coating composition was formed, and the drying properties, the ground opacifying properties, and the ground adhesiveness of the coating composition after being applied and dried were evaluated. The obtained results are listed in Table 7 or Table 8.

TABLE 7

|  |  | Example 1D | Example 2D | Example 3D | Example 4D | Example 5D | Example 6D | Example 7D | Example 8D |
|---|---|---|---|---|---|---|---|---|---|
| Triisocyanate (A) | T-1 |  |  |  |  | 50 |  |  |  |
|  | T-2 | 50 | 25 | 75 | 90 |  |  | 50 | 40 |
|  | T-3 |  |  |  |  |  | 50 |  |  |
| Polyisocyanate (B) | P-1D | 50 | 75 | 25 | 10 | 50 | 50 |  |  |
|  | P-2D |  |  |  |  |  |  | 50 |  |
|  | P-3D |  |  |  |  |  |  |  | 60 |
|  | TPA-100 |  |  |  |  |  |  |  |  |
|  | TSA-100 |  |  |  |  |  |  |  |  |
|  | Ratio between uretdione structure and iminooxadiazine structure | 0.22 | 0.22 | 0.22 | 0.22 | 0.22 | 0.22 | 0.14 | 0.28 |
| Polyisocyanate mixture | Uretdione dimer (% by mass) | 6.0 | 9.0 | 3.0 | 1.2 | 6.0 | 6.0 | 4.0 | 9.5 |
| Viscosity | mPas/25° C. | 90 | 240 | 60 | 35 | 85 | 95 | 170 | 110 |
| Decrease in viscosity |  | A | B | A | A | A | A | B | B |
| Drying properties |  | A | B | A | A | B | A | A | B |
| Ground opacifying properties |  | A | A | B | B | A | A | A | A |
| Ground adhesiveness |  | A | A | B | B | A | A | B | A |

TABLE 8

|  |  | Comparative Example 1D | Comparative Example 2D | Comparative Example 3D | Comparative Example 4D | Comparative Example 5D | Comparative Example 6D |
|---|---|---|---|---|---|---|---|
| Triisocyanate (A) | T-1 | 100 |  |  |  |  |  |
|  | T-2 |  |  | 50 | 25 |  | 50 |
|  | T-3 |  |  |  |  | 100 |  |
| Polyisocyanate (B) | P-1D |  |  |  |  |  | 3 |
|  | P-2D |  |  |  |  |  |  |
|  | P-3D |  |  |  |  |  |  |
|  | TPA-100 |  | 100 | 50 |  |  | 47 |
|  | TSA-100 |  |  |  | 75 |  |  |
|  | Ratio between uretdione structure and iminooxadiazine structure | 0 | <0.02 | <0.02 | <0.02 | 0 | <0.02 |
| Polyisocyanate mixture | Uretdione dimer (% by mass) | 0 | <1.0 | <1.0 | <1.0 | 0 | <1.0 |
| Viscosity | mPas/25° C. | 10 | 1350 | 120 | 230 | 50 | 115 |
| Decrease in viscosity |  | A | C | B | B | A | B |
| Drying properties |  | B | B | A | B | A | A |
| Ground opacifying properties |  | A | C | A | A | B | A |
| Ground adhesiveness |  | C | D | C | C | C | C |

In Tables 7 and 8, "TPA-100" and "TSA-100" indicate the following materials.

TPA-100: HDI-based isocyanurate type polyisocyanate "DURANATE TPA-100" (trade name, manufactured by Asahi Kasei Corporation, viscosity: 1350 mPa·s/25° C.)

TSA-100: HDI-based urethane-modified isocyanurate type polyisocyanate "DURANATE TSA-100" (trade name, manufactured by Asahi Kasei Corporation, viscosity: 550 mPa·s/25° C.)

Example 9D 0.03 g of 2,2,4-trimethylpentane was added to 300 g of LTI to obtain an isocyanate composition. A polyisocyanate mixture was obtained in the same operation as in Example 1D except that this isocyanate composition was used in place of T-2.

The evaluation results of this polyisocyanate mixture were the same as those in Example 1D.

Example 10D 0.03 g of hexadecane was added to 300 g of LTI to obtain an isocyanate composition. A polyisocyanate mixture was obtained in the same operation as in Example 1D using this isocyanate composition.

The evaluation results of this polyisocyanate mixture were the same as those in Example 1D.

(Synthesis Example 7D) Synthesis of C-1

N-substituted carbamic acid ester C-1 was obtained in the same manner as in Synthesis Example 5C.

Example 11D 0.03 g of the N-substituted carbamic acid ester C-1 was added to 300 g of LTI to obtain an isocyanate composition. A polyisocyanate mixture was obtained in the same operation as in Example 1D except that this isocyanate composition was used in place of T-2.

The evaluation results of this polyisocyanate mixture were the same as those in Example 1D.

As described above, it was confirmed that each polyisocyanate mixture of each example to which the present invention had been applied had a low viscosity and excellent physical properties of the coating film such as drying properties, ground opacifying properties, and adhesiveness to the ground coating film.

INDUSTRIAL APPLICABILITY

The coating composition obtained by using the polyisocyanate mixture of the present invention as a curing agent can be used as a coating material for roll coating, curtain flow coating, spray coating, bell coating, or electrostatic coating. Further, the coating composition can also be used as a primer or a top and intermediate coating material for materials, for example, metals such as a steel plate and a surface-treated steel plate, plastic, wood, films, and inorganic materials. Further, the coating composition is also useful as a coating material for imparting heat resistance and decorativeness (surface smoothness or sharpness) to pre-coated metal containing a rust preventive steel plate or automobile coating. Further, the coating composition is also useful as a urethane raw material such as an adhesive, a pressure sensitive adhesive, an elastomer, foam, or a surface treatment agent.

The invention claimed is:

1. A polyisocyanate mixture comprising:
a triisocyanate compound (A) represented by Formula (I); and
polyisocyanate (B1) obtained by using a polyester polyol containing three or more hydroxyl groups as a raw material, the polyisocyanate (B1) having a number average molecular weight of 850 to 5000, which is obtained from at least one diisocyanate selected from the group consisting of aliphatic diisocyanates;
wherein Formula (I) is

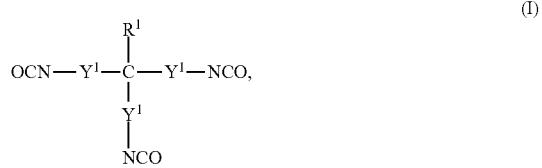

in which each $Y^1$ independently represents a single bond or a divalent hydrocarbon group having 1 to 20 carbon atoms which may have an ester structure and/or an ether structure, each $Y^1$ may be the same as or different from one another, and $R^1$ represents a hydrogen atom or a monovalent hydrocarbon group having 1 to 12 carbon atoms.

2. The polyisocyanate mixture according to claim 1, wherein a content of the triisocyanate compound (A) is in a range of 10% by mass to 90% by mass based on a total amount of the polyisocyanate mixture.

3. A coating composition comprising:
the polyisocyanate mixture according to claim 1; and
a compound which has two or more active hydrogens in a molecule.

4. A coating film which is obtained by curing the coating composition according to claim 3.

5. The polyisocyanate mixture according to claim 1, wherein a number average molecular weight of the polyisocyanate (B1) is in a range of 850 to 4000.

6. The polyisocyanate mixture according to claim 1, wherein an average number of isocyanate groups contained in one molecule of the polyisocyanate in the polyisocyanate mixture is in a range of 3.2 to 8.

7. A polyisocyanate mixture comprising:
a triisocyanate compound (A) represented by Formula (I); and
polyisocyanate (B4) which is obtained from aliphatic diisocyanate containing at least 1,6-diisocyanatohexane and in which an expression of (a+b)/(a+b+c+d+e+f) in a case where each mol % of an uretdione structure, an iminooxadiazine dione structure, an isocyanurate structure, an allophanate structure, a urethane structure, and a biuret structure is set as a, b, c, d, e, and f is in a range of 0.02 to 0.50;
wherein Formula (I) is

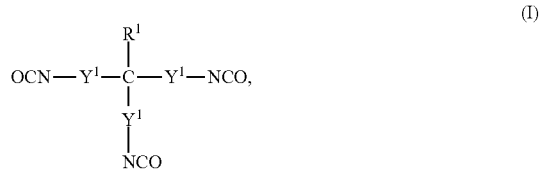

in which each $Y^1$ independently represents a single bond or a divalent hydrocarbon group having 1 to 20 carbon atoms which may have an ester structure and/or an ether structure, each $Y^1$ may be the same as or different from one another, and $R^1$ represents a hydrogen atom or a monovalent hydrocarbon group having 1 to 12 carbon atoms.

8. The polyisocyanate mixture according to claim 7,
wherein the polyisocyanate (B4) contains 1% to 40% by mass of an uretdione dimer derived from aliphatic isocyanate based on a total amount of the polyisocyanate mixture.

* * * * *